(12) United States Patent
Nakamura et al.

(10) Patent No.: US 7,520,260 B2
(45) Date of Patent: Apr. 21, 2009

(54) MULTISTAGE FUEL-INJECTION INTERNAL COMBUSTION ENGINE

(75) Inventors: Makoto Nakamura, Kanagawa (JP); Tomio Hokari, Kanagawa (JP); Seinosuke Hara, Kanagawa (JP); Seiji Suga, Kanagawa (JP); Masahiko Watanabe, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 93 days.

(21) Appl. No.: 11/520,606

(22) Filed: Sep. 14, 2006

(65) Prior Publication Data

US 2007/0074702 A1   Apr. 5, 2007

(30) Foreign Application Priority Data

Sep. 30, 2005   (JP)   ............................. 2005-286668

(51) Int. Cl.
  *F02B 3/00*   (2006.01)
  *F02M 69/46*   (2006.01)
(52) U.S. Cl. ...................... 123/299; 123/456
(58) Field of Classification Search ............. 123/90.15, 123/294, 299, 300, 456
  See application file for complete search history.

(56) References Cited

U.S. PATENT DOCUMENTS 5,636,603 A   6/1997   Nakamura et al.

6,269,791 B1 *   8/2001   Tanaka et al. ............... 123/300
6,636,797 B2   10/2003   Yoshizawa et al.

FOREIGN PATENT DOCUMENTS

| JP | 1-315631 A | 12/1989 |
| JP | 8-260923 A | 10/1996 |
| JP | 2004-76618 A | 3/2004 |
| JP | 2006-57535 A | 3/2006 |

OTHER PUBLICATIONS

Akasaka et al., JSAE Journal, Gasoline Engine: Recent Trends in Variable Valve Actuation Technologies to Reduce the Emission and Improve the Fuel Economy, vol. 59, No. 2, pp. 33-38, 2005.
Tanaka et al., JSAE Journal, "1 800 bar Common Rail System for Diesel Engine," vol. 58, No. 4, pp. 19-24, 2004.
Kakuya et al., 2005 JSAE Annual Congress, "Development of a Gasoline HCCI Engine Control System (Second Report)," No. 20055184, pp. 5-8, May 18, 2005.
English translation of Chinese Office Action dated Mar. 28, 2008.

* cited by examiner

*Primary Examiner*—Willis R. Wolfe, Jr.
*Assistant Examiner*—Johnny H. Hoang
(74) *Attorney, Agent, or Firm*—Foley & Lardner LLP

(57) ABSTRACT

In a multi-stage fuel-injection internal combustion engine employing a fuel injection system and a variable valve actuation system, engine valve timings are variably controlled depending on engine operating conditions. An electronic engine control unit is configured to execute cooperative control of the timing of sub-injection, injected before main injection, responsively to intake valve closure timing, and also to execute cooperative control of the timing of sub-injection, injected after the-main injection, responsively to exhaust valve open timing.

20 Claims, 10 Drawing Sheets

FIG.8A
IT1
(UNIT: DEGREES OF CRANKANGLE)
| | | |
|---|---|---|
| -190 | -170 | -160 |
| -150 | -150 | -150 |
| -40 | -150 | -150 |
L % (vertical axis), V rpm (horizontal axis)
FIG.8B
IVC
(UNIT: DEGREES OF CRANKANGLE)
| | | |
|---|---|---|
| -180 | -160 | -150 |
| -150 | -150 | -150 |
| -180 | -150 | -150 |
L % (vertical axis), V rpm (horizontal axis)
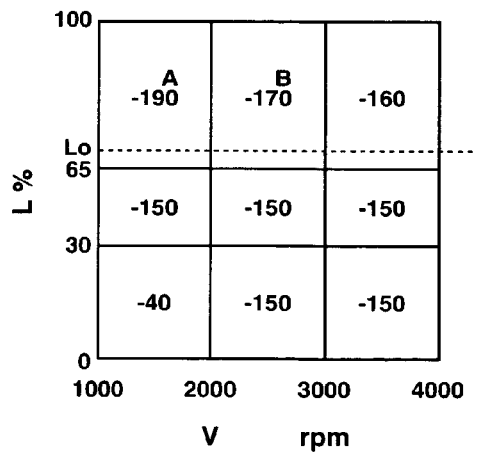
FIG.9A
IT1
(UNIT: DEGREES OF CRANKANGLE)
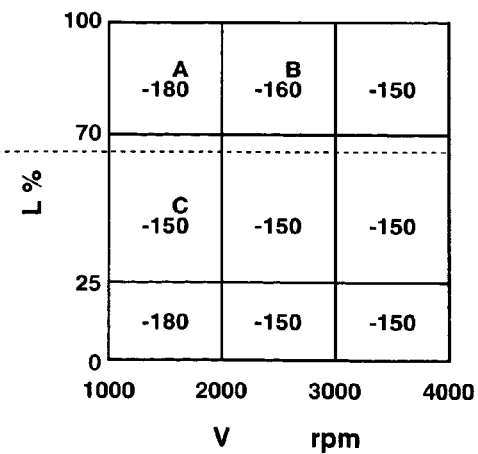
FIG.9B
IVC
(UNIT: DEGREES OF CRANKANGLE)

MULTISTAGE FUEL-INJECTION INTERNAL COMBUSTION ENGINE

TECHNICAL FIELD

The present invention relates to a multistage fuel-injection internal combustion engine employing a variable valve actuation control (VVC) system for at least one of intake and exhaust valves and a multistage fuel-injection system capable of injecting fuel at a plurality of injection timings per one operating cycle of events, and specifically to the improvement of a multistage fuel-injection internal combustion engine control technology suited to compression ignition engines such as a four-stroke-cycle Diesel engine, a two-stroke-cycle Diesel engine, a premix compression ignition gasoline engine, and the like.

BACKGROUND ART

In recent years, a variable valve actuation control (VVC) system, capable of variably adjusting a valve lift and valve timing of at least one of intake and exhaust valves of an internal combustion engine depending on engine operating conditions, is widely utilized for controlling a charging efficiency, an effective compression ratio, and an amount of residual gas of the engine, thereby enhancing the combustion performance and engine power performance and exhaust emission control performance. In gasoline engines, the premixed air-fuel mixture is ignited by means of a spark plug. Recently, there have been developed and advanced studies of "compression ignition engine technologies". In Diesel engines or premix compression ignition engines including gasoline engines, air alone is compressed during the compression stroke, and then fuel, which is sprayed or injected into the cylinder, is self-ignited due to a temperature rise of the compressed air (heat produced by compressing the incoming air).

The ignition lag, which controls or manages the state of combustion, changes depending on the temperature and pressure of air-fuel mixture, and various states or various characteristics of air-fuel mixture, for example, a turbulence intensity, and a fuel property. In other words, a deviation of the ignition lag from an optimal value varies depending on the air-fuel mixture temperature, air-fuel mixture pressure, turbulence intensity in the combustion chamber, fuel property, and the like. By means of the VVC system, it is possible to adjust-the-effective compression ratio, thereby compensating for a deviation of the ignition lag from an optimal value. As a consequence, it is possible to optimally control the state of combustion by means of the VVC system. Note that the effective compression ratio is correlated to a geometrical compression ratio but differs from the geometrical compression ratio. The geometrical compression ratio often denoted by Greek letter "$\epsilon$" is generally defined as a ratio $(V1+V2)/V1$ of the full volume $(V1+V2)$ existing within the engine cylinder and combustion chamber with the piston at a bottom dead center (BDC) position to the clearance-space volume (V1) with the piston at a top dead center (TDC) position. On the other hand, the effective compression ratio denoted by Greek letter "$\epsilon'$" is generally defined as a ratio of the effective cylinder volume corresponding to the maximum working medium volume to the effective clearance volume corresponding to the minimum working medium volume. These two compression ratios $\epsilon$ and $\epsilon'$ are thermodynamically distinguished from each other. The state of combustion is affected by various factors as well as effective compression ratio $\epsilon'$, for example, the air-fuel mixture temperature, and thermodynamic and hydrodynamic properties or characteristics (boost pressure created by a super-charging system, super-charged air temperature, cooling characteristics in a cooling system, an amount of deposits adhered to the cylinder wall, an amount of external EGR (exhaust gas recirculated), and the like). Additionally, for the same intake valve closure timing, the effective compression ratio $\epsilon'$ is affected by several factors, for example the air-fuel mixture temperature at the beginning of compression stroke, the air-fuel mixture pressure at the beginning of compression stroke, and the EGR amount.

There have been proposed and developed various multistage fuel-injection control technologies for Diesel engines or in-cylinder direct-injection gasoline engines in which fuel is injected directly into the engine cylinder. According to such multistage fuel-injection control, fuel injection of one operating cycle of events is split to several times (a plurality of fuel-injection pulses), for the purpose of good air/fuel mixture blending and improved combustion. A fuel injection pattern of one cycle is classified into a plurality of injection areas, for example, a pilot-injection area, a main-injection area, and an after-injection area. Japanese document "JSAE Journal Vol. 58, No. 4, 2004, pp 19-24" published by Society of Automotive Engineers of Japan, Inc. and titled "1800 bar Common Rail System for Diesel Engine" and written by two authors Yasushi Tanaka and Koji Nagata, teaches a fuel injection system employing a high-response high-speed high-precision fuel-injection valve capable of injecting a very small amount of fuel at a very short injection interval. In the case of the high-response fuel-injection valve described in the Japanese document "JSAE Journal Vol. 58, No. 4, 2004, pp 19-24", during the combustion stroke for one engine cylinder, fuel injection of five times at the maximum can be executed. By way of high-precision fuel injection of multiple times for each engine operating cycle, it is possible to realize the reduced exhaust emissions and reduced combustion noise. For instance, when subsidiarily injecting a very small amount of fuel before main injection, it is possible to simultaneously reduce nitrogen oxides (NOx) and particulate matter (PM) contained in the exhaust gases. Furthermore, subsidiary injection of a very small amount of fuel (hereinafter is referred to as "sub-injection") taking place after main injection, results in a rise in exhaust gas temperature, that is, a catalyst temperature rise. This contributes to (i) rapid catalyst activation during cold engine operation, and (ii) burning of the particulate matter (PM) accumulated in a Diesel particulate filter, often abbreviated to "DPF", that is, removal of the PM emissions from the DPF, in other words, DPF regeneration.

The timing of sub-injection is determined based on engine operating conditions and electronically controlled over wide range of conditions under which the engine operates. In particular, in premix compression ignition engines, the ignition of air-fuel mixture is controlled by way of the intake valve closure timing, often denoted by "IVC" and expressed in terms of crank angle. In more detail, it is possible to variably adjust the mass of air entering the engine cylinder at the beginning of compression stroke by retarding or advancing the intake valve closure timing. It is possible to retard a rise in in-cylinder pressure and a rise in in-cylinder temperature with respect to a predetermined crankangle. In other words, it is possible to lower the effective compression ratio $\epsilon'$ by retarding an in-cylinder pressure rise and/or an in-cylinder temperature rise by way of variable adjustment of intake valve closure timing IVC. One such IVC adjustment type variable compression ratio device for a compression ignition engine has been disclosed in Japanese Patent Provisional Publication No. 1-315631 (hereinafter is referred to as "JP1-315631"). In the case of JP1-315631, the IVC adjustment type variable compression ratio device is exemplified in a two-stroke-cycle Diesel engine. Concretely, when it is determined that the current operating condition of the two-stroke-cycle Diesel engine corresponds to an engine starting period, intake valve closure timing IVC is phase-advanced towards a timing value near bottom dead center (BDC) by means of an electric-motor driven variable valve actuation control device (or a motor-driven-variable valve timing control (VTC) system), thereby increasing an effective compression ratio $\epsilon'$ and consequently enhancing the self-ignitability during the starting period. In contrast, during engine normal operation, intake valve closure timing IVC is phase-retarded to decrease the effective compression ratio $\epsilon'$ and consequently to reduce a fuel consumption rate. The rotary-to-linear motion converter (the ball-bearing screw mechanism) of JP1-315631 is comprised of a warm shaft (i.e., a ball bearing shaft with helical grooves) driven by a step motor, an inner slider (i.e., a recirculating ball nut), recirculating balls provided in the helical grooves, and an outer slider axially movable together with the inner slider and rotatable relative to the inner slider. The other type of variable valve operating device has been disclosed in Japanese document "JSAE Journal Vol. 59, No. 2, 2005" published by Society of Automotive Engineers of Japan, Inc. and titled "Gasoline Engine: Recent Trends in Variable Valve Actuation Technologies to Reduce the Emission and Improve the Fuel Economy" and written by two authors Yuuzou Akasaka and Hajime Miura. The Japanese document "JSAE Journal Vol. 59, No. 2, 2005" discloses various types of variable valve operating systems, such as a helical gear piston type two-stepped phase control system, a rotary vane type continuously variable valve timing control (VTC) system, a swing-arm type stepped valve lift and working angle variator, a continuously variable valve event and lift (VEL) control system, and the like. The VTC and VEL control systems are operated by means of respective actuators for example electric motors or electromagnets, each of which is directly driven in response to a control signal (a drive signal) from an electronic control unit (ECU). Alternatively, the VTC and VEL control systems are often operated indirectly by means of a hydraulically-operated device, which is controllable electronically or electromagnetically.

SUMMARY OF THE INVENTION

However, in the prior-art internal combustion engine employing both the VVC system and the multistage fuel-injection system, in particular, in the prior-art compression ignition engine employing these two systems, the sub-injection timing is determined based on engine operating conditions and controlled over wide range of conditions under which the engine operates, whereas the intake valve timing (in particular, intake valve closure timing) and the exhaust valve timing (in particular, exhaust valve open timing) are also determined based on the engine operating conditions and controlled over wide range of operating conditions. There is an increased tendency for the operation of the VVC system and the operation of the electronic fuel injection control system to interfere with each other.

As discussed above, in premix compression ignition engines, the ignition of air-fuel mixture is controlled by way of intake valve closure timing IVC, and therefore in the presence of a delay in intake valve closure timing IVC, intake valve closure timing IVC tends to approach to the fuel injection timing (exactly, the start of fuel injection) Owing to such a delay in intake valve closure timing IVC, there is an increased tendency for the intake-valve closing operation and the fuel-injection operation to interfere with each other. On the other hand, the timing of sub-injection occurring after main injection, that is, the timing of after-injection for DPF regeneration, tends to approach to the exhaust valve open timing, often denoted by "EVO", and thus there is an increased tendency for the after-injection timing and the exhaust valve open timing EVO to interfere with each other.

More concretely, when the timing of sub-injection occurring before main injection, that is, the timing of before-injection for reduced exhaust emissions (reduced NOx and reduced PM), tends to approach to the intake valve closure timing IVC, there is an increased tendency for the before-injection timing and the intake valve closure timing IVC to interfere with each other. Actually, there are the following many problems of undesirable interference between engine valve timing control and multistage fuel injection control.

When the intake valve remains opened after fuel has been injected, part of the injected fuel tends to leak from the engine cylinder into the induction system and thus the leaked fuel does not participate in combustion, thereby resulting in the lowered effect of sub-injection, that is, the reduced engine power output and deteriorated emission control performance.

At the moment that the intake valve closes, air-fuel mixture in the cylinder tends to flow back to the intake valve side. Fuel injected from the fuel injection valve is influenced by the back flow of air-fuel mixture toward the intake valve side, so that the direction (or the course) of the injected fuel flow is undesirably deflected or changed. This also results in the lowered effect of sub-injection.

Owing to vaporization of the injected fuel, the mixture temperature (in other words, the in-cylinder temperature) tends to fall. On the other hand, the effective compression ratio control, performed by the VVC system, is affected by the mixture temperature fall, arising from the injected fuel vaporization. More concretely, owing to the deflected flow direction of the injected fuel, the rate of vaporization of the sprayed fuel varies, and therefore, for the same intake-valve closure timing, the mixture temperature tends to undesirably change. And thus, there is a problem to let the effect of effective compression ratio control performed by the VVC system be out of order.

In the case that the exhaust temperature has to be risen by way of sub-injection occurring after main injection, i.e., after-injection for DPF regeneration, exhaust valve open timing EVO is phase-advanced, while the timing of sub-injection (after-injection) is phase-retarded. However, assuming that an excessive delay in the injection timing of after-injection occurs, part of the injected fuel tends to leak from the engine cylinder into the exhaust system. Under these conditions, unburned fuel tends to reach the catalytic converter and the Diesel particulate filter (DPF) and thus there is a possibility that the unburned fuel is rapidly burned in the catalytic converter and/or in the DPF. Thus, there is a tendency for the catalytic converter and/or the DPF to be damaged due to such rapid burning of unburned fuel.

Moreover, the previously-discussed sub-injection causes an exhaust temperature rise on the expansion stroke and an exhaust temperature rise on the exhaust stroke. The VVC system incorporated in the premix compression ignition engine that the amount of residual gas is controlled by the exhaust valve closure timing, often denoted by "EVC" and as a result of this the state of ignition is controlled, is greatly influenced by the exhaust temperature rise, arising from the sub-injection.

Hitherto, combustion control performed through the VVC system for improved combustion and another combustion control performed through the multistage fuel-injection system for the same purpose were executed independently of each other.

Japanese document "2005 JSAE Annual Congress. No. 20055184, Yokohama, Japan, May 18, 2005" published by Society of Automotive Engineers of Japan, Inc. and titled "Development of Gasoline HCCI Engine Control System" and written by an author H. Kakuya, et al., teaches the control of a manipulated variable of an engine valve (intake and/or exhaust valves) based on the measured state of combustion and the control of a manipulated variable of a fuel injection system based on the measured state of combustion. However, the manipulated variable of the engine valve of the valve operating system and the manipulated variable of the fuel injection system are controlled separately from each other without relevancy. Thus, it is impossible to satisfactorily solve the previously-discussed problem of undesirable interference between the first combustion control performed through the VVC system and the second combustion control performed through the multistage fuel-injection system.

Thus, it would be desirable to provide a means by which the undesirable control interference between the first and second combustion controls can be satisfactorily avoided.

It is, therefore, in view of the previously-described disadvantages of the prior art, an object of the invention to provide a multistage fuel-injection internal combustion engine employing a VVC system and a multistage fuel-injection system, in which combustion control can be optimized without undesired interference between the first combustion control performed by the VVC system for improved combustion and the second combustion control performed by the multistage fuel-injection system for the same purpose.

In order to accomplish the aforementioned and other objects of the present invention, a multi-stage fuel-injection internal combustion engine comprises a fuel injection system enabling at least one sub-injection in addition to main injection, a variable valve actuation control system capable of changing intake valve closure timing or exhaust valve open timing, and a control unit being responsive to operating conditions of the engine, for executing cooperative control of sub-injection timing responsively to either one of the intake valve closure timing and the exhaust valve open timing.

According to another aspect of the invention, a multi-stage fuel-injection internal combustion engine comprises a fuel injection system capable of injecting fuel at a plurality of injection timings in one operating cycle of the engine, a variable valve actuation control system capable of changing intake valve closure timing or exhaust valve open timing by changing a valve lift characteristic or valve-open and valve-closure timings of at least one of an intake valve and an exhaust valve, and a control unit configured to define at least two domains of a specified engine operating region as a first operating range and a second operating range and to set one of the injection timings to have a predetermined first relation with either one of the intake valve closure timing and the exhaust valve open timing in the first operating range and to set one of the injection timings to have a predetermined second relation with either one of the intake valve closure timing and the exhaust valve open timing in the second operating range.

According to a further aspect of the invention, a multi-stage fuel-injection internal combustion engine comprises a fuel injection system capable of injecting fuel at a plurality of injection timings in one operating cycle of the engine, a variable valve actuation control system capable of changing intake valve closure timing or exhaust valve open timing by changing a valve lift characteristic or valve-open and valve-closure timings of at least one of an intake valve and an exhaust valve, a sensor provided to detect the valve lift characteristic or the valve-open and valve-closure timings of at least one of the intake and exhaust valves, and a control unit being responsive to a sensor signal from the sensor, for executing cooperative control of one of the injection timings responsively to either one of the intake valve closure timing and the exhaust valve open timing.

According to a still further aspect of the invention, a multi-stage fuel-injection internal combustion engine comprises a fuel injection system enabling at least one sub-injection in addition to main injection, a variable valve actuation control system capable of changing intake valve closure timing or exhaust valve open timing, a first sensor provided to detect operating conditions of the engine, a second sensor provided to detect a valve lift characteristic or valve-open and valve-closure timings of at least one of an intake valve and an exhaust valve, and a control unit configured to initiate cooperative control of sub-injection timing responsively to either one of the intake valve closure timing and the exhaust valve open timing, when a difference between the intake valve closure timing detected by the second sensor and a desired intake valve closure timing value determined based on the engine operating conditions detected by the first sensor becomes greater than or equal to a predetermined threshold value or when a difference between the exhaust valve open timing detected by the second sensor and a desired exhaust valve open timing value determined based on the engine operating conditions detected by the first sensor becomes greater than or equal to the predetermined threshold value.

According to another aspect of the invention, a multi-stage fuel-injection internal combustion engine comprises a fuel injection system enabling at least sub-injection injected before main injection and sub-injection injected after the main injection, a first variable valve actuation mechanism capable of changing at least intake valve closure timing, a second variable valve actuation mechanism capable of changing at least exhaust valve open timing, and a control unit being responsive to operating conditions of the engine, for executing cooperative control of the timing of the first sub-injection, injected before the main injection, responsively to the intake valve closure timing, and for executing cooperative control of the timing of the second sub-injection, injected after the main injection, responsively to the exhaust valve open timing.

The other objects and features of this invention will become understood from the following description with reference to the accompanying drawings.

BRIEF DESCRIPTION OF THE DRAWINGS

FIG. 8A is a conceptual drawing of a lookup table used to determine the first sub-injection timing IT1 based on engine speed V and engine load L.

FIG. 8B is a conceptual drawing of a lookup table used to determine the intake valve closure timing IVC based on engine speed V and engine load L.

FIG. 9A is a preprogrammed lookup table used to determine the first sub-injection timing IT1 based on engine speed V and engine load L, in the engine control system of the multistage fuel-injection engine of the embodiment.

FIG. 9B is preprogrammed lookup table used to determine the intake valve closure timing IVC based on engine speed V and engine load L, in the engine control system of the multistage fuel-injection engine of the embodiment.

DESCRIPTION OF THE PREFERRED EMBODIMENTS

Figure 1:
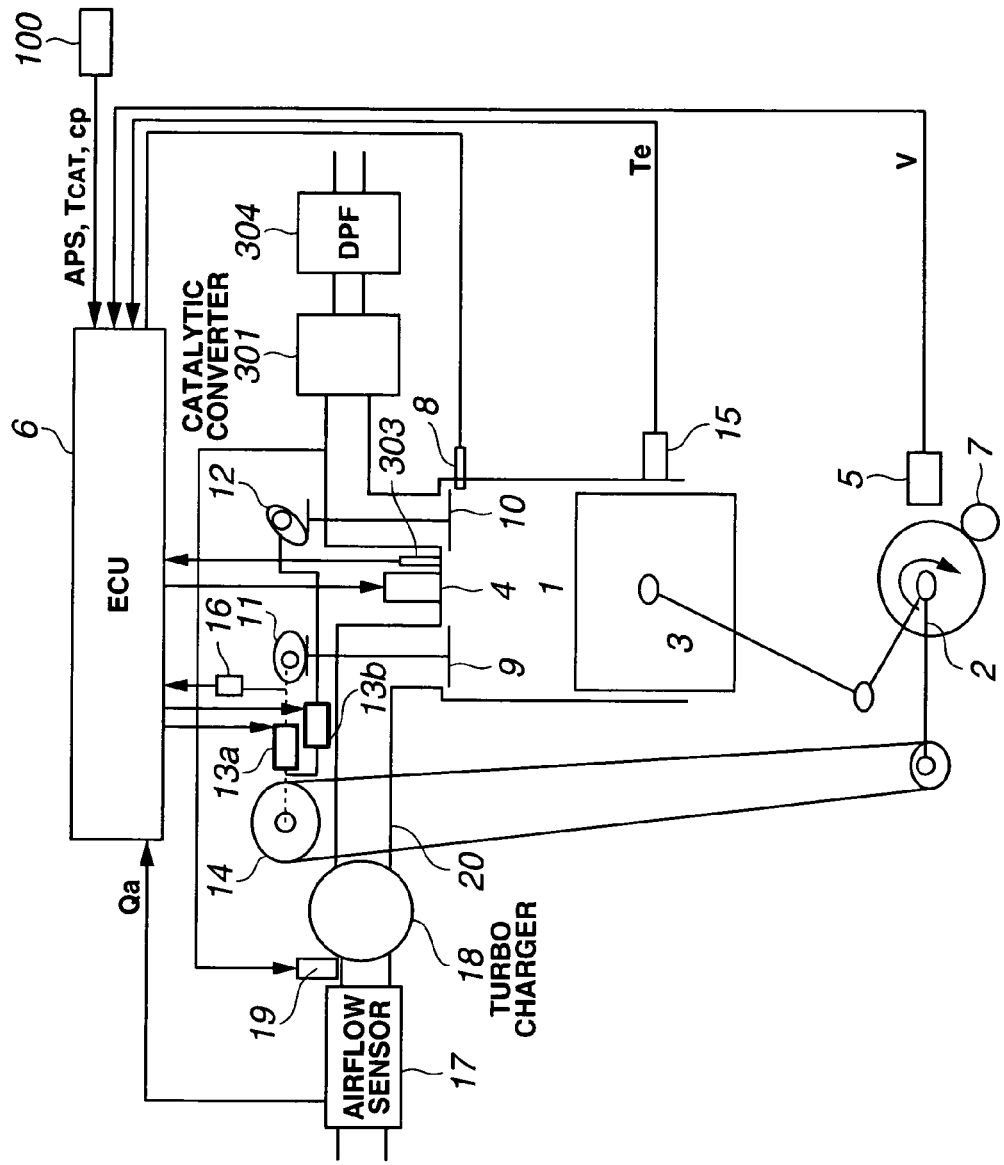
FIG. 1 is a system block diagram illustrating an embodiment of a multistage fuel-injection internal combustion engine employing at least a variable valve actuation control (VVC) system, a multistage fuel-injection system, and an electronic engine control system.

Referring now to the drawings, particularly to FIG. 1, the variable valve actuation control (VVC) system incorporated in the multistage fuel-injection internal combustion engine of the embodiment is exemplified in a four-stroke-cycle engine. As indicated by the arrow in the system block diagram of FIG. 1, a crankshaft 2 of an engine 1 rotates clockwise. As is generally known, a piston position at which a reciprocating piston 3 has moved to the bottom of the cylinder of engine 1, corresponds to 180 degrees of crank angle. The lowest piston position is called "bottom dead center (BDC)". A piston position obtained when engine crankshaft 2 further rotates and thus piston 3 has reached the top of the engine cylinder, corresponds to 360 degrees of crank angle (360° crank angle) or 0° crank angle. The highest piston position is called "top dead center (TDC)".

In the case of usual diesel combustion, diesel fuel (fuel oil) is sprayed or injected via a fuel injection valve 4 into the cylinder during the compression stroke. Then, the sprayed fuel is self-ignited and combusted due to the high-temperature high-pressure compressed gas (heat produced by compressing the incoming air). On the other hand, in the case of premix compression ignition, fuel is sprayed or injected via fuel injection valve 4 into the cylinder during the intake stroke so that the sprayed fuel is sufficiently premixed with air charged in the cylinder. Residual gas is set to a comparatively large amount for a temperature rise in air-fuel mixture. When piston 3 moves up, a temperature rise and a pressure rise in premixed air-fuel mixture occur, thereby resulting in spontaneous ignition of the air-fuel mixture so that the mixture is combusted. A fuel injection amount and injection timing of fuel injection valve 4 included in the electronic injection control system are both controlled, responsively to a sensor signal from a crank angle sensor 5, by means of an electronic control unit (ECU) 6. The purpose of crank angle sensor 5 is to inform the ECU 6 of engine speed V as well as the relative position of crankshaft 2.

In the case of gasoline premixed combustion, under a specific engine operating condition where compression ignition is difficult, air-fuel mixture is secondarily ignited by means of a spark plug (not shown), so that combustion develops according to flame propagation. In spark-ignition internal combustion engines, the ignition timing of the spark plug is controlled, responsively to a sensor signal from crank angle sensor 5, by means of electronic control unit (ECU) 6.

During start operation, an engine starter 7 is operated to crank the engine 1 or to turn the crankshaft 2. In the case of a hybrid-vehicle engine, rather than using starter 7, engine 1 is rotated by means of a motor generator. Additionally, during the starting period, an electric current is applied to a glow plug 8 for a temperature rise in glow plug 8 and for promotion of vaporization of fuel, thus supporting or assisting spontaneous ignition. Harmful exhaust emission gases such as carbon monoxide (CO), hydrocarbons (HCs), soot, nitrogen oxides (NOx), and the like, are filtered out and purified by means of a catalytic converter 301.

Additionally, particulate matter (PM) contained in the exhaust gases is accumulated or trapped in a Diesel particulate filter (DPF) 304. The DPF 304 is constructed by a ceramic diesel particulate filter or a heat-resistant-alloy diesel particulate filter. To avoid the engine power output from being dropped due to undesired blocking of the DPF 304 and thus to prevent an increase in the resistance to exhaust gas flow, the density of air-fuel mixture is controlled to a richer fuel/air ratio in such a manner as to cause an exhaust-temperature rise; thus achieving adequate burning of the particulate matter (PM), that is, removal of the PM emissions from the DPF, in other words, DPF regeneration.

An intake valve 9 and an exhaust valve 10 are installed in the upper part of engine 1. Intake valve 9 is driven by an intake cam 11, whereas exhaust valve 10 is driven by an exhaust cam 12. Intake cam 11 is mechanically linked via a variable valve actuation mechanism (or a variable valve characteristic adjustment mechanism) 13a to a camshaft timing pulley 14. On the other hand, exhaust cam 12 is mechanically linked via a variable valve actuation mechanism (or a variable valve characteristic adjustment mechanism) 13b to camshaft timing pulley 14. In the embodiment shown in FIG. 1, a hydraulically-operated rotary vane type variable valve timing control (VTC) mechanism or a motor-driven spiral disk type VTC mechanism (see FIG. 5) is used as variable valve actuation mechanism 13a, 13b. In lieu thereof, a continuously variable valve event and lift control (VEL) mechanism (see FIG. 16) may be used as variable valve actuation mechanism 13a, 13b. As the variable valve actuation control (VVC) system, the VTC mechanism and the VEL mechanism may be combined with each other.

Rotation of crankshaft 2 is transmitted via a timing belt, a timing chain or the like to camshaft timing pulley 14. In the shown embodiment, exhaust cam 12 is linked directly to camshaft timing pulley 14. Alternatively, exhaust cam 12 may be linked to camshaft timing pulley 14 through the VTC mechanism 13a for intake cam 11. In lieu thereof, exhaust cam 12 may be linked to camshaft timing pulley 14 through the separate VTC mechanism 13b differing from the VTC mechanism 13a associated with intake cam 11.

A sensor signal from an engine temperature sensor (a water temperature sensor or an engine coolant temperature sensor) 15, which detects engine temperature Te, is input into ECU 6. A sensor signal 11s from a camshaft sensor 16 of the VTC system is also input into ECU 6. Camshaft sensor 16 is located near the intake camshaft associated with intake cam 11. Camshaft timing pulley 14 is driven by the engine crankshaft at ½ the revolution speed of crankshaft 2. In the variable valve actuation control (VVC) system of FIG. 1, intake cam 11 is rotated with a phase difference between an angular phase detected by crank angle sensor 5 and an angular phase detected by camshaft sensor 16. The valve-opening action of intake valve 9 is performed once for each two revolutions of crankshaft 2, for entry of air into the cylinder.

During rotation of camshaft timing pulley 14, exhaust cam 12 linked to camshaft timing pulley 14 is also driven. The valve-opening action of exhaust valve 12 is performed once for each two revolutions of crankshaft 2, for exhausting burned gas from the engine cylinder. As can be seen from the left-hand side of FIG. 1, an air flow sensor 17, a turbo charger 18 included in the super-charging system, and an exhaust gas recirculation (EGR) valve 19 are installed in an induction system 20 and arranged upstream of intake valve 9. Air flow sensor 17 is provided for measuring the quantity Qa of air entering the engine cylinder. As the other engine/vehicle sensors 100, there are an accelerator position sensor, a catalyst temperature sensor, an in-cylinder pressure sensor, and the like. As input information indicative of engine load L, the input interface of ECU 6 receives a sensor signal from the accelerator position sensor that detects an amount APS of depression of an accelerator pedal. The in-cylinder pressure sensor is attached to the engine cylinder, for detecting an in-cylinder pressure value cp. The catalyst temperature sensor is generally located downstream of the catalytic converter in the exhaust system, for detecting a catalyst temperature value $T_{CAT}$.

Variable valve actuation mechanism 13a, 13b (or the VTC mechanism in the engine control system of the multistage fuel-injection engine of the embodiment shown in FIG. 1) is a variable phase control means, which is operable simultaneously with cranking operation of engine 1. In the case that the VVC system employs the hydraulically-operated rotary vane type variable valve timing control (VTC) mechanism, as a matter of course, the VTC mechanism is operated by hydraulic pressure produced by an oil pump of engine 1, and therefore the hydraulic pressure produced by the engine oil pump tends to drop during cranking operation. Due to such a drop in the supplied hydraulic pressure, the VVC system (or the VTC mechanism) has uncertainty in controlling the valve timing (IVC and/or IVO) of intake valve 9. Under a particular condition where the VVC system (or the VTC mechanism) has uncertainty in controlling the valve timing due to a drop in hydraulic pressure produced by the engine oil pump, for example, during cranking, a separate electric-motor driven hydraulic oil pump (not shown) is driven simultaneously with the ignition-switch turn-ON operation so as to quickly satisfactorily feed or deliver hydraulic pressure to the VTC mechanism.

During normal engine operation in a four-stroke-cycle compression ignition engine, such as a four-stroke-cycle Diesel engine, exhaust valve 10 starts to open at 180 degrees of crank angle (or just before 180° crank angle) at the beginning of exhaust stroke. The timing where exhaust valve 10 starts to open is called as "exhaust valve open timing EVO". Exhaust valve 10 starts to close-at the end of exhaust stroke. The timing where exhaust valve 10 starts to close is called as "exhaust valve closure timing EVC". On the other hand, intake valve 9 starts to open at a timing value near 0° crank angle at the beginning of intake stroke. The timing where intake valve 9 starts to open is called as "intake valve open timing IVO". Intake valve 9 starts to close at a timing value near BDC (corresponding to 180 degrees of crank angle) or just after BDC at the end of intake stroke. The timing where intake valve 9 starts to close is called as "intake valve closure timing IVC".

Figure 2:
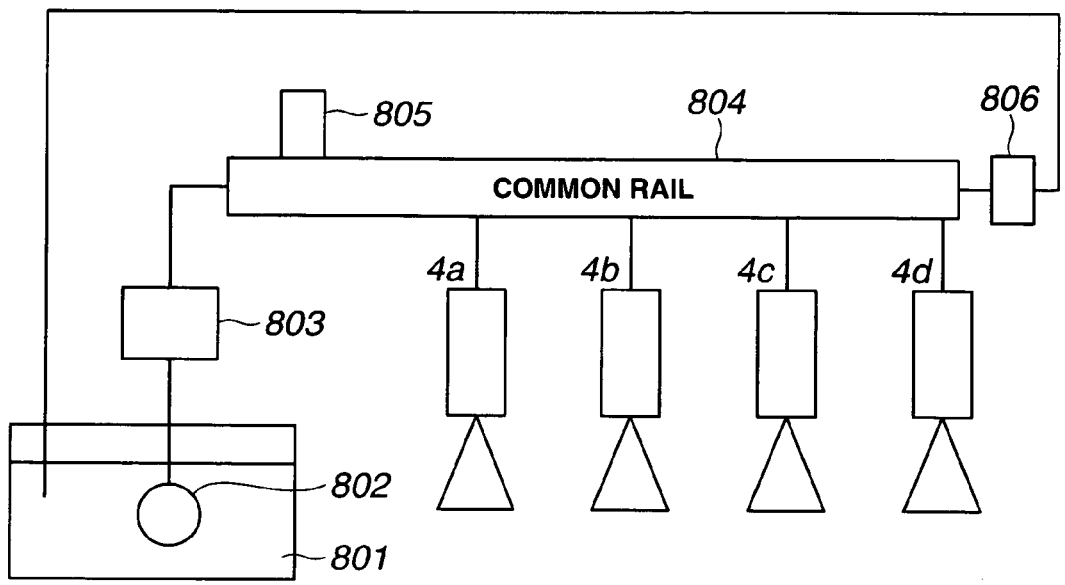
FIG. 2 is a system diagram illustrating the multistage fuel-injection system incorporated in the multistage fuel-injection internal combustion engine of the embodiment.
Figure 3:
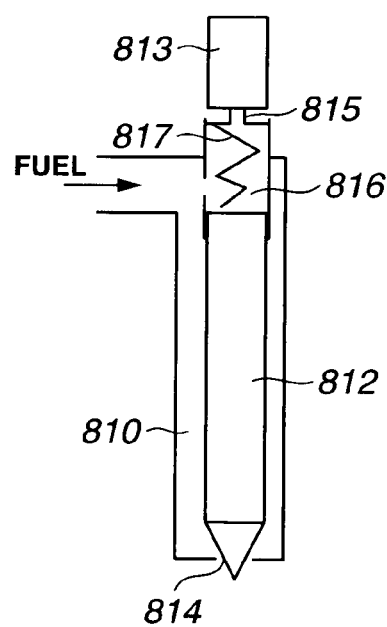
FIG. 3 is a construction drawing illustrating the construction of a fuel injection valve of the fuel-injection system shown in FIG. 2.

Fuel injection valves 4, constructing a part of the fuel injection system, are installed on the cylinder head. In the case of a four-cylinder engine shown in FIG. 2, fuel is injected or sprayed through four injection valves 4a, 4b, 4c, and 4d, collectively referred to as "injection valve 4", into respective engine cylinders. The upstream portions of injection valves 4a-4d are connected to a common fuel rail 804, constructed by one pipe. Fuel is supplied from a fuel tank 801, through a feed pump 802 and a high-pressure pump 803 into the common rail 804. Fuel pressure in common rail 804 is detected by a pressure sensor 805. When the fuel pressure in common rail 804 becomes high and exceeds a predetermined threshold value (a preset pressure value), a pressure regulator 806 (or a pressure regulating valve or a pressure relief valve) is shifted to its valve-open position, so as to keep the fuel pressure in common rail 804 substantially constant by returning the surplus fuel via pressure regulator 806 into fuel tank 801. Generally, the fuel pressure in common rail 804 is maintained at a constant pressure level ranging from 1000 atmosphere pressure to 2500 atmosphere pressure. As shown in FIG. 3, each of injection valves 4a-4d is comprised of a valve element 810, a nozzle 814, a plunger 812, a high-response high-precision actuator 813 (a piezoelectric element or the like), a fixed orifice 815, a control chamber 816, and a plunger spring 817.

When actuator 813 moves or displaces upwards, orifice 815 opens and thus the pressure in control chamber 816 falls. Owing to a pressure fall in control chamber 816, plunger 812 moves upwards and thus nozzle 814 lifts up and opens, so that fuel can be injected or sprayed through the nozzle into the cylinder. Conversely when actuator 813 moves downwards, orifice 815 closes and thus the pressure in control chamber 816 rises. Owing to a pressure rise in control chamber 816, plunger 812 is forced downwards by the spring force of plunger spring 817 and thus nozzle 814 closes so that the fuel injecting action is stopped. Under the constant fuel pressure (or the fixed fuel pressure), the length of time that the nozzle 814 opens determines the amount of fuel injected. The previously-discussed high-response fuel injection system of FIG. 2 enables high-precision split fuel injection (i.e., high-precision multistage fuel injection) that fuel injection of one operating cycle of events is split into several times (a plurality of fuel-injection pulses). Hitherto, one fuel injection occurred near TDC (near the end of compression stroke). On the contrary, according to the high-response fuel injection system of FIG. 2, it is possible to create a plurality of fuel-injection pulses during a time interval from the beginning of compression stroke to the end of expansion stroke.

Figure 4:
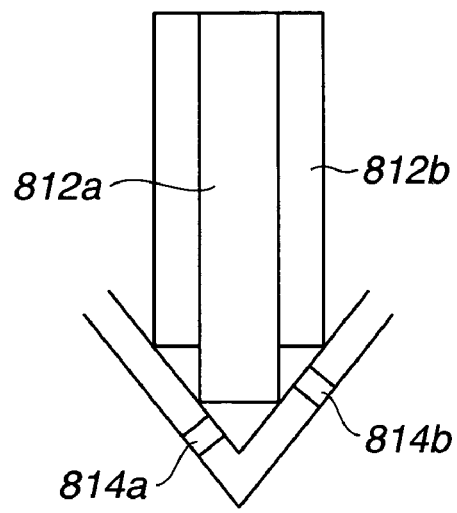
FIG. 4 is a schematic nozzle construction showing a variable nozzle-opening dual nozzle device, which is applicable to the fuel-injection system incorporated in the multistage fuel-injection internal combustion engine of the embodiment.

As the nozzle 814, as shown in FIG. 4, a variable nozzle-opening dual nozzle device may be used. The variable nozzle-opening dual nozzle device of FIG. 4 is capable of variably adjusting the nozzle opening depending on engine operating conditions, such as engine speed V and engine load L. The variable nozzle-opening dual nozzle device of FIG. 4 is comprised of a-first nozzle 814a, a second nozzle 814b, a first plunger 812a, and a second plunger 812b. As can be seen from the schematic nozzle construction of FIG. 4, when the second plunger (the outside plunger) 812b is pulled up, the second nozzle 814b opens. When the first plunger (the inside plunger) 812a is pulled up, it is possible to open the first nozzle 814a as well as the second nozzle 814b. By the use of the variable nozzle-opening dual nozzle device (814a, 814b), it is possible to set the fuel injection amount to an optimal value under the constant fuel-injection time length. Under these conditions, when only the first plunger (the inside plunger) 812a is pushed down, only the first nozzle 814a is closed, whereas the second nozzle 814b remains in the open position. In this case, the total nozzle opening area is equal to only the opening area of the second nozzle 814b. In this manner, by reducing the total opening area of nozzle 814, as a whole, it is possible to effectively lengthen the fuel-injection duration (injection pulse width) during which fuel injection is continuously executed. This provides almost the same effect as split fuel injection that fuel is injected multiple times (or at a plurality of injection timings) for each engine operating cycle.

Figure 5:
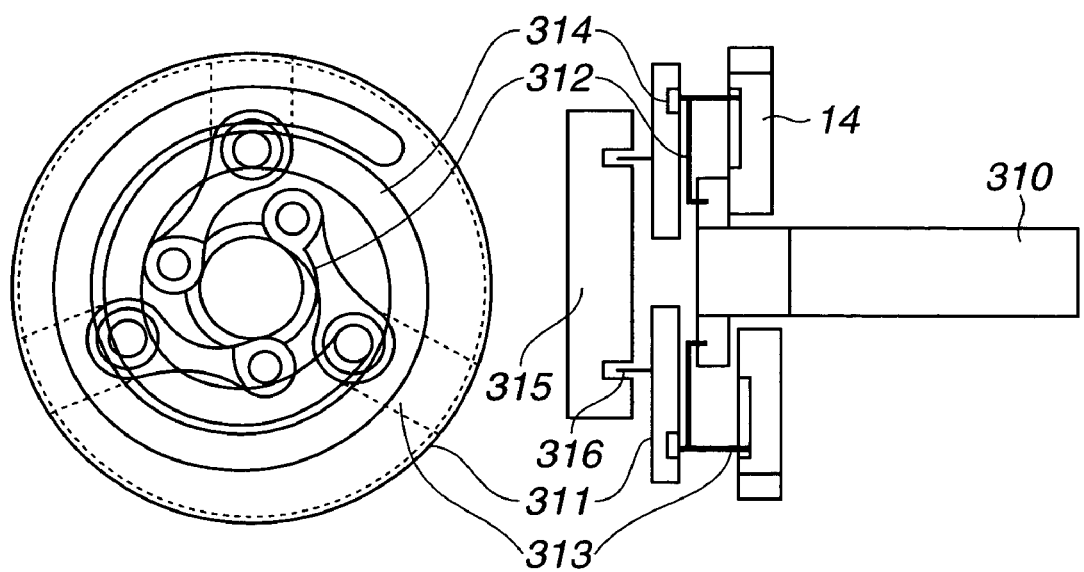
FIG. 5 is a construction drawing illustrating an electric-motor driven spiral disk type variable valve timing control (VTC) mechanism, which is applicable to the multistage fuel-injection engine of the embodiment.

As the VTC mechanism capable of enabling a relative phase change of a camshaft 310 to camshaft timing pulley 14, that is, a valve-timing change of the engine valve, a motor-driven spiral disk type VTC mechanism as shown in FIG. 5, may be used. Actually, in the case of the motor-driven spiral disk type VTC mechanism of FIG. 5, the phase difference between camshaft 310 and camshaft timing pulley 14 can be varied by means of a linkage (a motion converter) 312. The radial outside portion of linkage 312 is mechanically linked to both of camshaft timing pulley 14 and a spiral disk 311, such that the radial outside portion of linkage 312 slides along a guide groove 313 formed in camshaft timing pulley 14 and also slides along a guide groove 314 formed in spiral disk 311. On the other hand, the radial inside portion of linkage 312 is fixedly connected to camshaft 310. When the phase angle of spiral disk 311 relative to camshaft timing pulley 14 varies, the radial position of the outside portion of linkage 312 with respect to the axis of camshaft 310 varies, and thus a phase change of camshaft 310 relative to camshaft timing pulley 14 occurs. There are various methods to vary the phase angle of spiral disk 311 relative to camshaft 310. In the case of the motor-driven spiral disk type VTC mechanism shown in FIG. 5, a hysteresis motor 315 is used as an actuator (a driving power source or an electrically-controlled actuator means). Hysteresis motor 315 can apply torque to a hysteresis member 316 in a spaced, contact-free relationship with hysteresis member 316, for varying the phase angle of spiral disk 311 relative to camshaft timing pulley 14. Assuming that the car battery voltage is higher than a specified voltage value, the motor-driven VTC mechanism can be certainly operated by means of hysteresis motor 315 from the time when engine 1 is cranked. As is generally known, the magnitude of torque acting on hysteresis member 316 increases, as the applied electric current to hysteresis motor 315 increases. The increased torque acts to rotate hysteresis member 316 against the spring force of a biasing means such as a return spring (not shown). As a result, it is possible to continuously vary the relative phase of camshaft 310 to camshaft timing pulley 14 responsively to the current value of the applied current to hysteresis motor 315. Therefore, it is possible to accurately control or adjust the actual relative phase of camshaft 310 to camshaft timing pulley 14 to a desired value by controlling the applied current by way of closed-loop control (feedback control) in response to the sensor signal from camshaft sensor 16.

Figure 6:
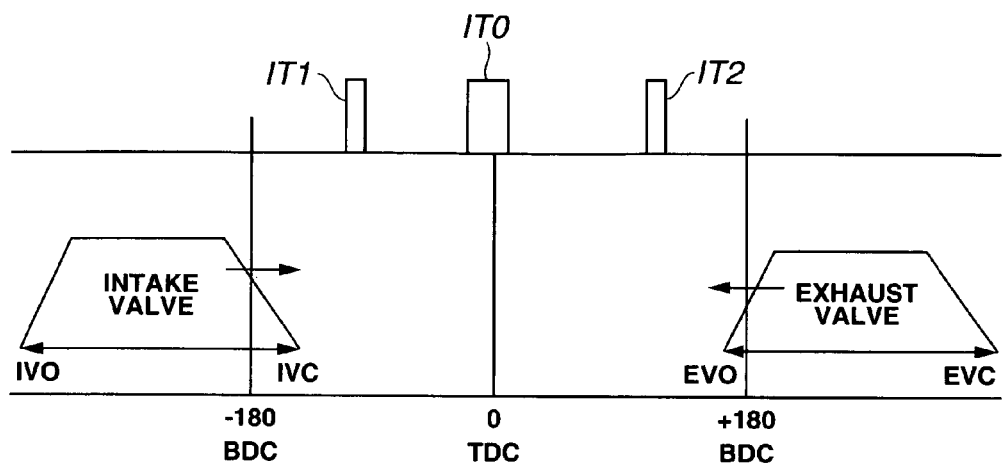
FIG. 6 is a characteristic diagram showing the relationship among a plurality of fuel-injection timings, intake valve open timing IVO, intake valve closure timing IVC, exhaust valve open timing EVO, and exhaust valve closure timing EVC, in the multistage fuel-injection engine of the embodiment.

To improve the combustion process, in Diesel engines or gasoline engines, the multistage fuel-injection system having a preprogrammed multistage fuel-injection characteristic as shown in FIG. 6 is used for injecting fuel several times in one operating cycle of the engine, namely, intake, compression, expansion (or power), and exhaust (two complete revolutions). As can be seen from the characteristic diagram of FIG. 6, subsidiary injection of a very small amount of fuel, denoted by the first sub-injection timing "IT1", takes place prior to main injection denoted by the main fuel injection timing "IT0". Injecting a very small amount of fuel before main injection timing IT0, partially creates premixed air-fuel mixture, thereby promoting easy burning of fuel sprayed during the main fuel injection period. By virtue of good combustion (easy burning) of fuel sprayed during the main injection period, it is possible to effectively reduce exhaust emissions such as smoke and particulates. The timing IT1 of sub-injection occurring before main injection timing IT0 will be hereinafter referred to as "before-injection timing IT1" or "1st sub-injection timing". Before-injection timing (1st sub-injection timing) IT1 is properly controlled depending on engine operating conditions (i.e., engine speed V and engine load L). According to the characteristic diagram of FIG. 6, subsidiary injection of a very small amount of fuel, denoted by the second sub-injection timing "IT2", also takes place after main injection denoted by main fuel injection timing IT0. The timing IT2 of sub-injection occurring after main injection timing IT0 will be hereinafter referred to as "after-injection timing IT2" or "2nd sub-injection timing". After-injection, denoted by after-injection timing (2nd sub-injection timing) IT2, contributes to a temperature rise in combustion gas, thereby enabling unburned gas to be completely purified in the combustion chamber, catalytic converter 301, and Diesel particulate filter (DPF) 304.

On the other hand, intake valve closure timing IVC is controlled depending on engine operating conditions so as to maintain the effective compression ratio $\epsilon'$ at the optimal value, thus preventing the combustion velocity from excessively increasing. Effective compression ratio $\epsilon'$ control contributes to the lengthened premixed time period, thereby effectively suppressing particulate matter (PM). Additionally, phase-advancing exhaust valve open timing EVO results in an exhaust temperature rise, thus enabling rapid activation of each of catalytic converter 301 and DPF 304. Simultaneously with engine valve timing adjustment for intake valve closure timing IVC and exhaust valve open timing EVO, intake valve open timing IVO and exhaust valve closure timing EVC are also controlled.

Figure 7:
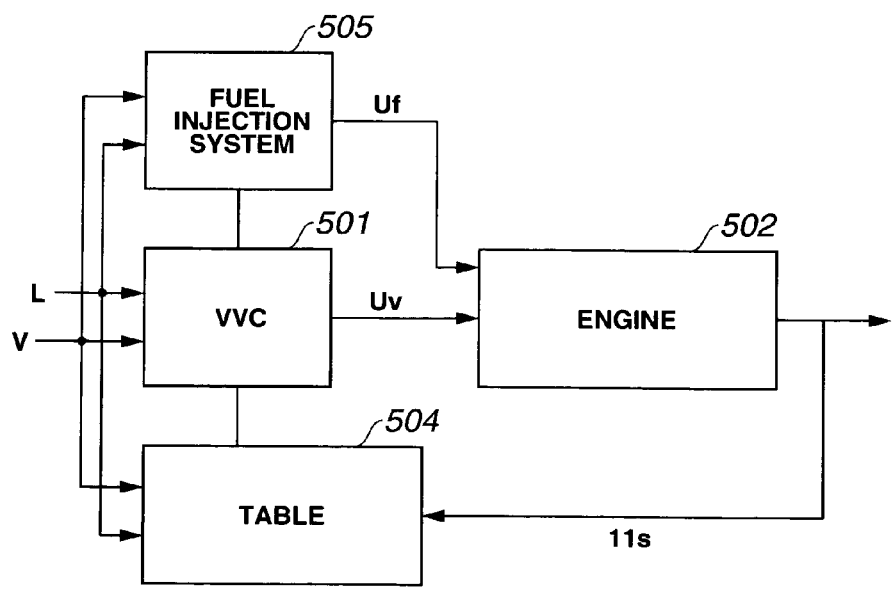
FIG. 7 is a block diagram of the engine control system incorporated in the multistage fuel-injection engine of the embodiment.

Referring now to FIG. 7, there is shown the block diagram for integrated engine control executed within ECU 6 of the engine control system incorporated in the multistage fuel-injection engine of the embodiment to improve both the engine power output and the combustion process. Within the variable valve actuation control (VVC) system 501 capable of varying the intake valve characteristic and the exhaust valve characteristic, the intake valve timing (IVC, IVO) and the exhaust valve timing (EVO, EVC) are controlled depending on engine operating conditions, that is, engine speed V and engine load L (e.g., the amount APS of depression of the accelerator pedal, detected by the accelerator position sensor). Within the fuel injection system 505 capable of adjusting or controlling fuel-injection timings, before-injection timing (1st sub-injection timing) IT1 and after-injection timing (2nd sub-injection timing) IT2 are controlled depending on the engine operating conditions.

As can be seen from the block diagram of FIG. 7, a signal indicative of engine speed V and a signal indicative of engine load L (e.g., accelerator-pedal depression amount APS) are input into each of the control block of VVC system 501 and the control block of fuel injection system 505. On the basis of the latest up-to-date information concerning engine speed V and engine load L, a manipulated variable Uf, including at least before-injection timing (1st sub-injection timing) IT1 of the fuel injection system, is determined, and the determined fuel-injection-system manipulated variable Uf is output from fuel injection system 505 to engine output devices (or actuators) 502, such as piezoelectric elements of the injection valves. In a similar manner, on the basis of the latest up-to-date information concerning engine speed V and engine load L, a manipulated variable Uv, including at least intake valve closure timing IVC of the VVC system, is determined, and the determined VVC-system manipulated variable Uv is output from VVC system 501 to engine output devices (or actuators) 502, for example, motor 315 of the VTC mechanism of the VVC system. Actually, the fuel-injection-system manipulated variable Uf is determined or retrieved based on engine speed V and engine load L from a preprogrammed V-L-Uf lookup table (or a preprogrammed V-L-Uf map) stored in a table block (or a retrieval block) 504. The VVC-system manipulated variable Uv is determined or retrieved based on engine speed V and engine load L from a preprogrammed V-L-Uv lookup table (or a preprogrammed V-L-Uv map) stored in table block (memory block) 504. Additionally, in retrieving the manipulated variables from the preprogrammed lookup table, the sensor signal 11s from camshaft sensor 16 is also utilized so that the actual relative phase of the camshaft to the camshaft timing pulley can be controlled or adjusted to a desired value by way of closed-loop control responsively to the sensor signal 11s from camshaft sensor 16.

As appreciated, as manipulated variables of engine output devices 502, there are (i) the manipulated variable Uv of VVC system 501, concretely, exhaust valve open timing EVO, exhaust valve closure timing EVC, intake valve open timing IVO, intake valve closure timing IVC, the exhaust valve lift characteristic, and the intake valve lift characteristic, and (ii) the manipulated variable Uf of fuel injection system 505, concretely, the fuel injection amount and fuel injection timing of each of injection valves. As previously discussed, these manipulated variables Uf and Uv can be determined based on engine speed V and engine load L (accelerator-pedal depression amount APS). As a matter of course, the manipulated variables Uf and Uv vary depending on the type and characteristics of engine.

To improve the exhaust-emission performance in Diesel engines, the use of a large amount of residual gas is very effective to properly retard the combustion velocity, thus creating the uniformly blended air-fuel mixture and consequently suppressing the generation of soot and NOx emissions. As a method to feed a large amount of residual gas into the engine cylinder, it is effective to increase the opening of EGR valve 19 of FIG. 1. In order to increase the rate of residual gas in the engine cylinder, exhaust valve closure timing EVC may be phase-advanced in such a manner as to shut up a large amount of burned gas in the cylinder. Usually, cooperative control for both the EGR amount and the exhaust valve closure timing EVC is made to more precisely control or adjust the amount of residual gas in the cylinder. The quantity of air entering the cylinder varies depending on the residual gas amount. Therefore, in order to optimize the combustion control, as can be seen from the block diagram of FIG. 7, all of the fuel injection system control (including both the fuel injection amount control and the fuel injection timing control) and the VVC system control have to be executed simultaneously.

When intake valve closure timing IVC is phase-retarded, air that has been introduced into the cylinder once, tends to flow back to induction system 20. As a result of this, the mass of air in the cylinder also reduces. Under this condition (with the IVC retarded), the fuel injection amount has to be properly controlled depending on a change in the air mass in the cylinder, arising from the back flow of air-fuel mixture from the cylinder to induction system 20. Suppose that the fuel injection amount is controlled regardless of such an air mass change in the cylinder. Undesirably, this may result in a deviation of the fuel/air ratio (F/A mixture ratio) from a desired value, thereby deteriorating the emission control performance. To avoid this, in the multistage fuel-injection internal combustion engine of the embodiment, simultaneously with execution of IVC control for the VVC system, the fuel injection amount for the fuel injection system is compensated for, so as to reconcile both the engine power performance and the exhaust emission control performance.

Referring now to FIGS. 8A-8B, there are shown the conceptual drawings concerning before-injection timing (1st sub-injection timing) IT1 and intake valve closure timing IVC, and relevant to the retrieval block (the table block) 504 of FIG. 7. FIG. 8A is the conceptual drawing of the V-L-IT1 lookup table (the V-L-IT1 map) showing how 1st sub-injection timing IT1 has to be varied depending-on engine speed V and engine load L, whereas FIG. 8B is the conceptual drawing of the V-L-IVC lookup table (the V-L-IVC map) showing how intake valve closure timing IVC has to be varied depending on engine speed V and engine load L. In FIG. 8A, there are nine different classified blocks (nine divided areas or nine defined domains) for 1st sub-injection timing IT1, respectively indicating −190° crankangle, −170° crankangle, −160° crankangle, −150° crankangle, −150° crankangle, −150° crankangle, −40° crankangle, −150° crankangle, and −150° crankangle. By way of interpolation, it is possible to precisely calculate 1st sub-injection timing IT1 based on the latest up-to-date information concerning engine speed V and engine load L, in spite of only the nine classified blocks for 1st sub-injection timing IT1. In FIG. 8B, there are nine different classified blocks (nine divided areas or nine defined domains) for intake valve closure timing IVC, respectively indicating −180° crankangle, −160° crankangle, −150° crankangle, −150° crankangle, −150° crankangle, −150° crankangle, −180° crankangle, −150° crankangle, and −150° crankangle. By way of interpolation, it is possible to precisely calculate intake valve closure timing IVC based on the latest up-to-date information concerning engine speed V and engine load L, in spite of only the nine classified blocks for intake valve closure timing IVC. The utilization of interpolation is effective to reduce the memory capacity of memories (RAM, ROM) of ECU 6.

Suppose that 1st sub-injection timing (before-injection timing) IT1 occurring at the beginning of compression stroke is excessively phase-advanced in comparison with intake valve closure timing IVC under a condition where 1st sub-injection timing (before-injection timing) IT1 and intake valve closure timing IVC are simultaneously controlled depending on engine operating conditions (i.e., engine speed V and engine load L). In such a case, part of fuel injected during the first sub-injection period tends to leak from the cylinder to induction system 20, thus lowering the thermal efficiency. Furthermore, suppose that 2nd sub-injection timing (after-injection timing) IT2 occurring at the end of exhaust stroke is excessively phase-retarded in comparison with exhaust valve open timing EVO under a condition where 2nd sub-injection timing (after-injection timing) IT2 and exhaust valve open timing EVO are simultaneously controlled depending on engine operating conditions. In such a case, part of fuel injected during the second sub-injection period tends to leak from the cylinder to the exhaust system, thus lowering the thermal efficiency.

On the one hand, the lookup tables for 1st sub-injection timing (before-injection timing) IT1 and intake valve closure timing IVC, both varied depending on engine operating conditions (i.e., engine speed V and engine load L), are clearly shown in FIGS. 8A-8B. On the other hand, for the purpose of simplification of the disclosure, conceptual drawings for lookup tables (or maps) used to retrieve the other valve timings (EVO, EVC, IVO) and the other sub-injection timing (IT2) are omitted.

As discussed above, 1st sub-injection timing (before-injection timing) IT1 and intake valve closure timing IVC, both varied depending on engine operating conditions. However, note that, as appreciated from the preprogrammed lookup tables (or preprogrammed characteristic maps) shown in FIGS. 9A-9B, a division of the preprogrammed 1st sub-injection timing IT1 table shown in FIG. 9A and a division of the preprogrammed intake valve closure timing IVC table shown in FIG. 9B are generally designed to differ from each other. For instance, suppose that engine load L changes from a certain load value in an operating range denoted by "A" to a load value L0 under a condition where the latest up-to-date information about engine speed V is within a speed range of 1000 rpm to 2000 rpm. Assuming that as a variable (or a parameter) of the axis of ordinate in each of the lookup tables of FIGS. 9A-9B, the common load value L is used, there is no problem of poor matching (mismatching) between the controlled variable for 1st sub-injection timing IT1 and the controlled variable for intake valve closure timing IVC. Conversely assuming that a variable (or a parameter) of the axis of ordinate in the IT1 lookup table of FIG. 9A differs from a variable (or a parameter) of the axis of ordinate in the IVC lookup table of FIG. 9B, there is a problem of poor matching between the operating range "A" of 1st sub-injection timing IT1 and the operating range "C" of intake valve closure timing IVC. Owing to such mismatching (poor phase-matching), 1st sub-injection timing IT1 tends to be excessively phase-advanced in comparison with intake valve closure timing IVC, and thus part of fuel injected during the first sub-injection period tends to leak from the cylinder to induction system 20. In the shown embodiment, as input variables or parameters (that is, a variable of the axis of ordinate and a variable of the axis of abscissa) used for each of IT1-retrieval of the lookup table (the map) of FIG. 9A and IVC-retrieval of the lookup table (the map) of FIG. 9B, the common variables, namely engine load L and engine speed V are used. In other words, determined based on the common parameters V and L are the manipulated variable Uv of the VVC system including at least exhaust valve open timing EVO, exhaust valve closure timing EVC, intake valve open timing IVO, and intake valve closure timing IVC, and the manipulated variable Uf of the fuel injection system including 1st sub-injection timing (before-injection timing) IT1, main injection timing IT0, and 2nd sub-injection timing (after-injection timing) IT2. Thus, the system of the embodiment ensures good matching between the controlled variable for 1st sub-injection timing IT1 retrieved from the table (the map) of FIG. 9A and the controlled variable for intake valve closure timing IVC retrieved from the table (the map) of FIG. 9B. In this manner, by way of accurate cooperative control (relevant-control) for the controlled variable (e.g., EVO, EVC, IVO, IVC) of the VVC system and the controlled variable (IT1, IT0, IT2) of the fuel injection system, it is possible to prevent 1st sub-injection timing IT1 from being excessively advanced as compared to intake valve closure timing IVC, thereby avoiding undesirable leakage of part of fuel injected during the 1st sub-injection period to induction system 20. Additionally, it is possible to prevent 2nd sub-injection timing IT2 from being excessively retarded as compared to exhaust valve open timing EVO, thereby avoiding undesirable leakage of part of fuel injected during the 2nd sub-injection period to the exhaust system. As a result of this, a drop in thermal efficiency can be effectively prevented.

In the IT1 lookup table shown in FIG. 9A and the IVC lookup table shown in FIG. 9B, for example, near an engine load value L ranging from 65% to 70%, there is a possibility that 1st sub-injection timing IT1 is excessively phase-advanced in comparison with intake valve closure timing IVC. Under such a load condition ranging from 65% to 70%, suppose that, as input variables or parameters used for each of IT1-retrieval of the lookup table of FIG. 9A and IVC-retrieval of the lookup table of FIG. 9B, the common variables, namely engine load L and engine speed V are not used. This deteriorates matching between the controlled variable for 1st sub-injection timing IT1 retrieved from the table of FIG. 9A and the controlled variable for intake valve closure timing IVC retrieved from the table of FIG. 9B, thereby lowering the retrieval accuracy of the IT1 lookup table and the IVC lookup table. This means that there is an increased tendency for part of the injected fuel to leak from the cylinder via intake valve 9 to induction system 20. In contrast, in the shown embodiment, as input variables or parameters used for each of retrieval of the IT1 lookup table (see FIG. 9A) and retrieval of the IVC lookup table (see FIG. 9B), the common variables, namely engine load L and engine speed V are used. Therefore, in the multistage fuel-injection engine of the embodiment, it is possible to prevent undesirable leakage of part of fuel injected during the 1st sub-injection period from the cylinder via intake valve 9 to induction system 20 and undesirable leakage of part of fuel during the 2nd sub-injection period from the cylinder via exhaust valve 10 to the exhaust system.

As can be seen from the lookup tables of FIGS. 9A-9B, there are a plurality of operating ranges, which are classified or defined based on engine operating conditions (i.e., engine speed V and engine load L). For instance, in the lookup tables of FIGS. 9A-9B, a first domain of the specified engine operating region, substantially corresponding to the every engine operating region of the multi-stage fuel-injection engine, is classified or defined as the first operating range denoted by "A", and additionally a second domain of the specified engine operating region is classified or defined as the second operating range denoted by "B". That is, the two different defined engine operating ranges "A" and "B" are provided in FIGS. 9A-9B.

In the 1st operating range "A", one of fuel injection timings of one engine operating cycle, for example, 1st sub-injection timing (before-injection timing) IT1, is set to have a predetermined first relation with either one of intake valve closure timing IVC and exhaust valve open timing EVO. For instance, the predetermined first relation corresponds to a condition where intake valve closure timing IVC is minus 180° crankangle in the case that 1st sub-injection timing IT1 is minus 190° crankangle.

In the 2nd operating range "B", one of fuel injection timings of one engine operating cycle, for example, 1st sub-injection timing (before-injection timing) IT1, is set to have a predetermined second relation with either one of intake valve closure timing IVC and exhaust valve open timing EVO. For instance, the predetermined second relation corresponds to a condition where intake valve closure timing IVC is minus 160° crankangle in the case that 1st sub-injection timing IT1 is minus 170° crankangle.

By way of optimal settings of fuel injection timing (e.g., IT1) and engine valve timing (e.g., IVC), fully taking into account the relevancy between the settings of the controlled variable (e.g., IVC) of the VVC system and the controlled variable (e.g., IT1) of the fuel injection system, the interrelation (mutual relationship) between these two different timings (e.g., IT1 and IVC) become clear. The controlled variable (e.g., IT1) of the fuel injection system and the controlled variable (e.g., IVC) of the VVC system are optimally timed, thereby effectively preventing undesirable leakage of part of fuel injected during the 1st sub-injection period from the cylinder via intake valve 9 to induction system 20. In a similar manner, by way of optimal settings of fuel injection timing (e.g., IT2) and engine valve timing (e.g., EVO), fully taking into account the relevancy between the settings of the controlled variable (e.g., EVO) of the VVC system and the controlled variable (e.g., IT2) of the fuel injection system, the interrelation (mutual relationship) between these two different timings (e.g., IT2 and EVO) become clear. The controlled variable (e.g., IT2) of the fuel injection system and the controlled variable (e.g., EVO) of the VVC system are optimally timed, thereby effectively preventing undesirable leakage of part of fuel injected during the 2nd sub-injection period from the cylinder via exhaust valve 10 to the exhaust system.

As discussed above, the injection timing (IT1, IT0, IT2) of the fuel injection system and the engine valve timing (EVO, EVC, IVO, IVC, and/or intake-valve timing and lift characteristic and exhaust-valve timing and lift characteristic) of the VVC system can be controlled in real time, while retrieving the preprogrammed lookup tables. However, a change of state in air-fuel mixture in the engine cylinder, created responsively to control commands to the respective engine valves (intake and exhaust valves 9 and 10), tends to retard owing to a mechanical response delay of the VVC system. Suppose that the fuel injection timing is determined without fully taking account of the mechanical response delay of the VVC system. In such a case, fuel injection (i.e., the injection amount and injection timing) does not match the state of air-fuel mixture in the engine cylinder. This deteriorates the thermal efficiency. As is generally known, due to various factors, such as a mechanical response delay and an electrical response delay of the engine valve operating system, a hydrodynamic delay in each of the induction and exhaust systems and the like, there is a time delay until an actual change of state in air-fuel mixture in the cylinder takes place after a control command signal has been output from the ECU to the output stage (actuator) of the VVC system. In contrast to the VVC system having various response delays, the high-response fuel injection system of FIG. 2, enabling high-precision multistage fuel injection, can control or adjust both the injection timing and the injection amount without any time delay. Thus, cooperative control (relevant-control) between the VVC system and the fuel injection system is essential to or indispensable to elimination or avoidance of the operating-speed difference between the high-response fuel injection system and the low-response VVC system.

The mass of fuel injected from fuel injection valve 4 is controlled responsively to a sensor signal from air flow sensor 17 measuring the quantity Qa of air entering the engine cylinder, a sensor signal from the accelerator position sensor detecting the accelerator-pedal depression amount APS, and a sensor signal from crank angle sensor 5 by which engine speed V is detectable. Furthermore, the mass of fuel and injection timing are determined, taking into account the state of EGR valve 19 (namely, the EGR valve opening substantially corresponding to the EGR amount) and the state of turbo charger 18 included in the super-charging system (namely, boost pressure created by turbo charger 18 and super-charged air temperature). As a matter of course, the quantity Qa of air entering the engine cylinder varies due to changes in intake valve closure timing IVC and intake valve open timing IVO. The injection amount and injection timing have to be changed responsively to changes in intake valve timings IVC and IVO. To achieve this, the sensor signal from camshaft sensor 16 is input into ECU 6, so as to change the fuel injection amount responsively to the phase of the VTC mechanism of the VVC system, in other words, the latest up-to-date information about intake valve closure timing IVC. In the case of one-stroke injection of the Diesel engine, as shown in FIG. 6, a fuel injection pattern is classified into a before-injection area (a 1st sub-injection IT1 area), a main-injection IT0 area, and an after-injection area (a 2nd sub-injection IT2 area). Alternatively, in the case of one-stroke injection of the Diesel engine, a fuel injection pattern may be classified into a pilot-injection area (a 1st sub-injection IT1 area), a before-injection area, a main-injection IT0 area, an after-injection area, and a post-injection area (a 2nd sub-injection IT2 area). The multistage fuel injection pattern varies depending on engine operating conditions. In the fuel injection system 505 shown in FIG. 7, the fuel injection pattern, substantially corresponding to the injection-system manipulated variable, is given as a function f(IVC) of intake valve closure timing IVC. By the use of the predetermined or preprogrammed function f(IVC) representative of the relationship between the fuel injection pattern and intake valve closure timing IVC, a change in intake valve closure timing IVC can be reflected immediately as a change in the fuel injection pattern (containing a fuel injection amount and the number of fuel injections).

As can be seen from the block diagram of FIG. 7, the control block of fuel injection system 505 and the control block of VVC system 501 are connected to each other for intercommunication and cooperative control. Also provided is a phase-angle sensor capable of detecting information indicative of the valve opening/closing state of intake valve 9 and/or exhaust valve 10 or the valve lifting state of intake valve 9 and/or exhaust valve 10. For example, as the phase-angle sensor, in the shown embodiment, camshaft sensor 16 (see FIG. 1) is used. The processor of the electronic control unit calculates or estimates, based on the sensor signal 11s from the phase-angle sensor (camshaft sensor 16), intake valve closure timing IVC and/or exhaust valve open timing EVO. Informational data signals indicative of the calculated IVC and/or the calculated EVO are transmitted from table block (retrieval block) 504 through the control block of VVC system 501 into the control block of fuel injection system 505. Responsively to a change in the sensor signal 11s from the phase-angle sensor (camshaft sensor 16), one of a plurality of fuel injection timings of one engine operating cycle, for example, 1st sub-injection timing (before-injection timing) IT1, is brought into cooperative control (relevant-control) with either one of intake valve closure timing IVC and exhaust valve open timing EVO. By way of cooperative control (relevant-control) between the controlled variable of the high-response fuel injection system and the controlled variable of the low-response VVC system, it is possible to eliminate the operating-speed difference between the fuel injection system and the VVC system, in other words, a deviation of the control responsiveness of the low-response VVC system from the control responsiveness of the high-response fuel injection system. Additionally, by way of the previously-discussed cooperative control (relevant-control), it is possible to effectively prevent the control characteristics of the VVC system and the fuel injection system from deteriorating even in a transient engine operating condition.

In addition to the above, in the multistage fuel-injection engine of the embodiment, when the difference between the engine valve timing (IVC, EVO), which is calculated or estimated based on the sensor signal 11s from the phase-angle sensor (camshaft sensor 16) and regarded as an actual engine valve timing value, and its desired valve timing value (or a target valve timing value) determined based on the engine operating conditions, becomes greater than or equal to a predetermined threshold value, according to the integrated control system of the embodiment, it is possible to reliably eliminate the operating-speed difference between the fuel injection system and the VVC system, in other words, a deviation of the control responsiveness of the low-response VVC system from the control responsiveness of the high-response fuel injection system, by performing the previously-discussed cooperative control (relevant-control) between sub-injection timing (IT1, IT2) and engine valve timing (IVC, EVO). Therefore, even in a transient engine operating condition, it is possible to effectively reliably avoid undesirable oscillation (undesirable hunting) of the VVC control system and the fuel injection control system.

Figure 10:
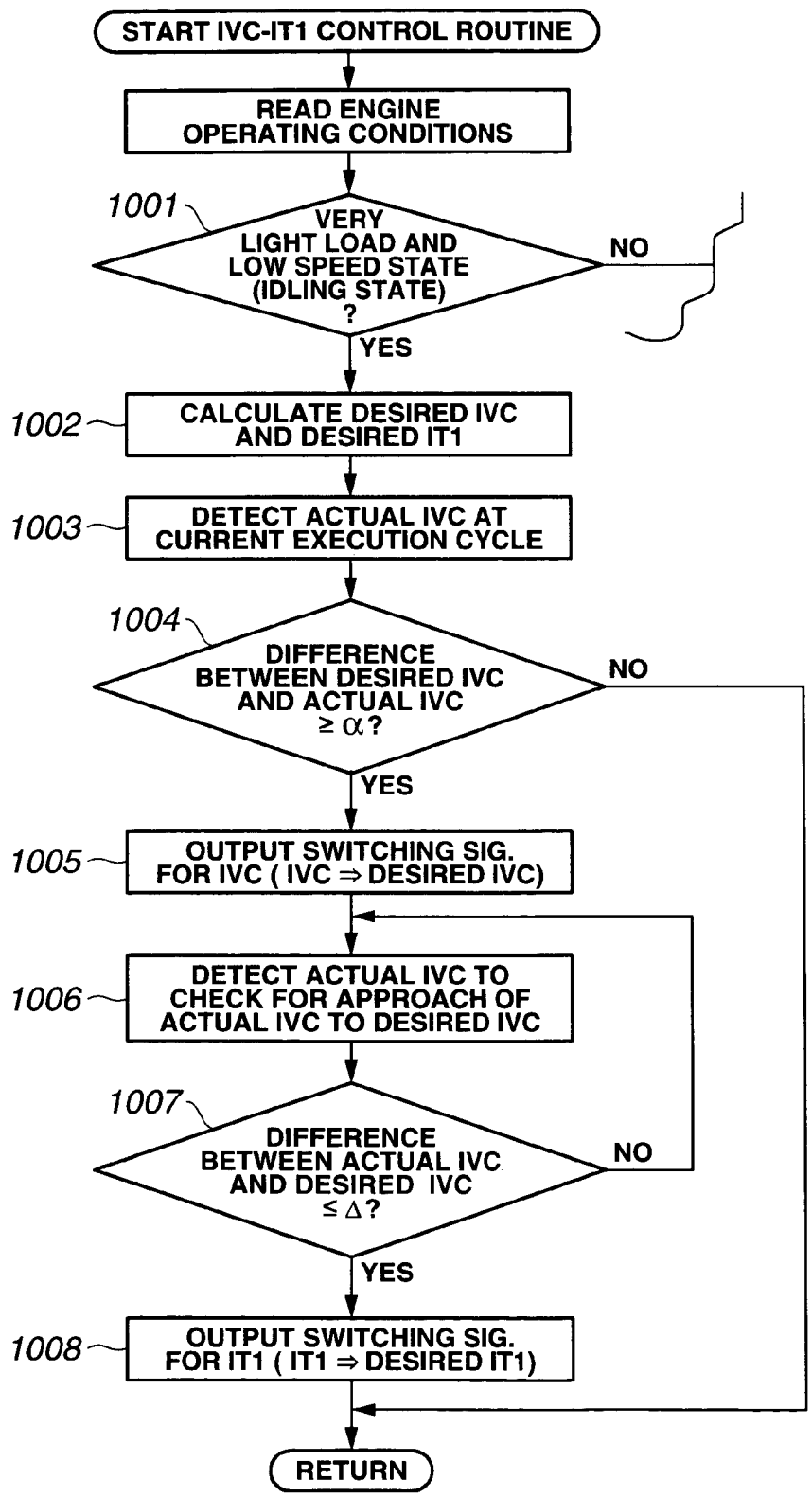
FIG. 10 is a flow chart showing an IVC-IT1 control routine executed within an electronic control unit (ECU) incorporated in the integrated engine control system of the multistage fuel-injection engine of the embodiment.

Referring now to FIG. 10, there is shown the IVC-IT1 control routine executed within ECU 6 incorporated in the integrated engine control system of the multistage fuel-injection engine of the embodiment. The IVC-IT1 control routine of FIG. 10 is executed as time-triggered interrupt routines to be triggered every predetermined time intervals such as 10 milliseconds.

First, engine operating conditions, namely, engine speed V and engine load L are read.

At step 1001, a check is made to determine whether engine 1 is in a very light load and low speed state, such as, an idling state. When the answer to step 1001 is in the affirmative (YES), that is, when engine 1 is in a very light load and low speed state (e.g., an idling state), the routine proceeds from step 1001 to step 1002. Conversely when the answer to step 1001 is in the negative (NO), the program exits the routine.

At step 1002, a desired value of intake valve closure timing IVC and a desired value of 1st sub-injection timing IT1, both suited to the current engine operating conditions (in other words, the latest up-to-date information concerning engine speed V and engine load L) are arithmetically calculated from the preprogrammed IVC lookup table of FIG. 9B and the preprogrammed IT1 lookup table of FIG. 9A.

At step 1003, an actual intake valve closure timing IVC at the current execution cycle is detected or extracted or estimated based on the sensor signal from camshaft sensor 16.

At step 1004, a check is made to determine whether a difference between the desired intake valve closure timing and the actual intake valve closure timing, exactly, the absolute value of the difference between the desired IVC and the actual IVC, becomes greater than or equal to a predetermined threshold value $\alpha$. When the answer to step 1004 is affirmative (YES), the routine proceeds from step 1004 to step 1005. Steps 1001-1004 are repeatedly executed until such time that the difference between the desired intake valve closure timing and the actual intake valve closure timing has exceeded the predetermined threshold value $\alpha$.

At step 1005, a switching signal for intake valve closure timing IVC is outputted. By virtue of step 1004, it is possible to effectively reliably avoid undesirable oscillation (undesirable hunting) of the VVC control system and the fuel injection control system. This also contributes to simplified and stabilized VVC system control and stabilized fuel injection system control.

At step 1006, the actual intake valve closure timing IVC is detected again, so as to check for approach of the actual IVC to the desired IVC.

At step 1007, a check is made to determine whether the difference between the actual intake valve closure timing and the desired intake valve closure timing, exactly, the absolute value of the difference between the actual IVC and the desired IVC, becomes less than or equal to a predetermined threshold value $\Delta$. When the answer to step 1007 is affirmative (YES), the routine proceeds from step 1007 to step 1008. Steps 1006-1007 are repeatedly executed until such time that the difference between the actual IVC and the desired IVC has become less than or equal to the predetermined threshold value $\Delta$.

At step 1008, a switching signal for 1st sub-injection timing IT1 is outputted for the first time.

According to the previously-discussed IVC-IT1 cooperative-control routine of FIG. 10, it is possible to avoid the problem of poor matching (mismatching) between the actual intake valve closure timing IVC and the actual 1st sub-injection timing IT1, thus effectively preventing the control characteristics of the VVC system and the fuel injection system from deteriorating even in a transient engine operating condition.

Figure 11:
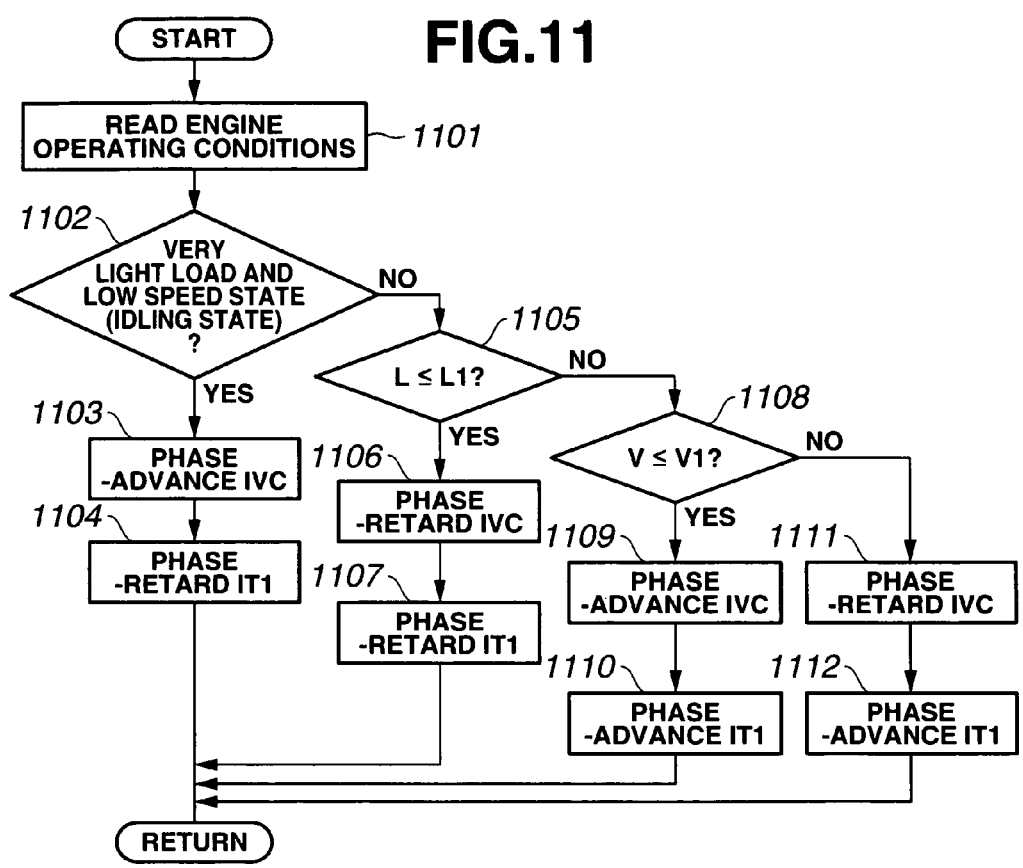
FIG. 11 is a flow chart showing the mutual relationship between the intake valve closure timing IVC and the first sub-injection timing IT1 in the multistage fuel-injection engine of the embodiment.
Figure 12:
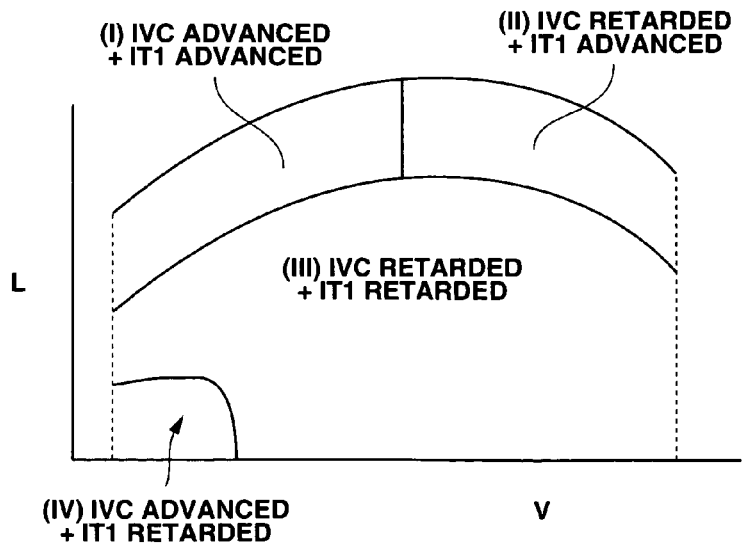
FIG. 12 is a preprogrammed characteristic map showing the relationship between the intake valve closure timing IVC and the first sub-injection timing IT1 in the multistage fuel-injection engine of the embodiment.

FIG. 11 shows the control flow concerning the cooperative control (relevant-control) routine of 1st sub-injection timing IT1 with respect to intake valve closure timing IVC control, in which intake valve closure timing IVC is controlled depending on engine operating conditions and simultaneously 1st sub-injection timing IT1 is controlled responsively to the intake valve closure timing IVC changed or controlled according to the intake valve closure timing IVC control. On the other hand, FIG. 12 shows the preprogrammed characteristic map concerning a combined characteristic of a phase change (phase-advance/phase-retard) of intake valve closure timing IVC and a phase change (phase-advance/phase-retard) of 1st sub-injection timing IT1 with respect to both of engine speed V and indicated engine torque (i.e., engine load L). In FIG. 12, the operating range (I) is an IVC phase-advance plus IT1 phase-advance area, the operating range (II) is an IVC phase-retard plus IT1 phase-advance area, the operating range (III) is an IVC phase-retard plus IT1 phase-retard area, and the operating range (IV) is an IVC phase-advance plus IT1 phase-retard area.

At step 1101 of the IT1 cooperative control (relevant-control) routine related to or correlated with IVC control, shown in FIG. 11, engine operating conditions, namely, engine speed V and engine load L are read.

At step 1102, a check is made to determine whether engine 1 is in a very light load and low speed state, such as, an idling state. When the answer to step 1102 is in the affirmative (YES), that is, when engine 1 is in a very light load and low speed state (e.g., an idling state), the routine proceeds from step 1102 to step 1103. Conversely when the answer to step 1102 is in the negative (NO), the routine proceeds from step 1102 to step 1105.

At step 1103, intake valve closure timing IVC is phase-advanced toward a timing value near bottom dead center (BDC).

At step 1104 executed subsequently to step 1103, 1st sub-injection timing IT1 is phase-retarded responsively to the phase advance of intake valve closure timing IVC, so as to rise the effective compression ratio $\epsilon'$. This minimizes undesirable back flow of part of fuel, which is injected during the first sub-injection period, from the cylinder to induction system 20, thereby effectively suppressing fluctuations in combustion every engine operating cycles in a very light load and low speed range such as idling. This means the enhanced combustion stability during idling. The rise in effective compression ratio $\epsilon'$ also contributes to the enhanced engine startability.

At step 1105, a check is made to determine whether the latest up-to-date informational data signal value concerning engine load L is less than or equal to a predetermined load value L1, which is greater than a very light load value L1 substantially corresponding to idling. When the answer to step 1105 is affirmative (L≦L1), the routine proceeds from step 1105 to step 1106. Conversely when the answer to step 1105 is negative (L>L1), the routine proceeds from step 1105 to step 1108.

At step 1106, intake valve closure timing IVC is phase-retarded to lower the effective compression ratio $\epsilon'$ during light load operation (L≦L1). This reduces a mechanical energy loss such as a pumping loss, thereby improving fuel economy.

At step 1107 executed subsequently to step 1106, 1st sub-injection timing IT1 is phase-retarded responsively to the phase retard of intake valve closure timing IVC, so as to achieve the improved formation of air-fuel mixture, while suppressing undesirable back flow of part of fuel, which is injected during the first sub-injection period, from the cylinder to induction system 20. This contributes to the stabilized emission control performance. During low load (L≦L1) and high speed operation, there is an increased tendency for the quantity of charged air to be increased by way of inertia supercharging (increased air pressure often called "ram pressure"). On the other hand, during low load (L≦L1) and high speed operation, to suppress the formation of NOx emissions by reducing effective compression ratio $\epsilon'$, intake valve closure timing IVC is phase-retarded (see step 1106). At the same time, by way of cooperative control (relevant-control) of the timings IVC and IT1 of the two different systems, 1st sub-injection timing IT1 is also phase-retarded to avoid the problem of poor matching between intake valve closure timing IVC and 1st sub-injection timing IT1, thus effectively suppressing or avoiding undesirable leakage of part of fuel injected during the 1st sub-injection period to induction system 20 and undesirably changed course of air-fuel mixture flow.

At step 1108, a check is made to determine whether the latest up-to-date informational data signal value concerning engine speed V is less than or equal to a predetermined speed value V1. When the answer to step 1108 is affirmative (V≦V1), the routine proceeds from step 1108 to step 1109. Conversely when the answer to step 1108 is negative (V>V1), the routine proceeds from step 1108 to step 1111.

At step 1109, intake valve closure timing IVC is phase-advanced toward a timing value near bottom dead center (BDC), so as to reduce the quantity of air flowing from the engine cylinder back to induction system 20. This contributes to the increased quantity of charged air, that is, enhanced charging efficiency, in other words, enhanced engine power output (enhanced engine torque output) in a high-load low-speed range.

At step 1110 executed subsequently to step 1109, 1st sub-injection timing IT1 is phase-advanced responsively to the phase advance of intake valve closure timing IVC, so as to lengthen the atomizing time period of fuel, thus promoting atomization of fuel. This effectively suppresses the generation of soot. Assuming that 1st sub-injection timing IT1 is not phase-advanced responsively to the phase advance of intake valve closure timing IVC during the high-load low-speed operation, there is a possibility that fuel is injected at the worst timing that the flow of air-fuel mixture in the cylinder has attenuated or dampened and thus the fuel-atomization performance deteriorates.

At step 1111, initiated under the high-speed high-load condition defined by L>L1 and V>V1, intake valve closure timing IVC is phase-retarded, so as to increase the quantity of charged air by way of inertia supercharging (increased air pressure, i.e., "ram pressure"), thus enhancing the engine power output.

At step 1112 executed subsequently to step 1111, 1st sub-injection timing IT1 is phase-advanced responsively to the phase retard of intake valve closure timing IVC, so as to ensure the lengthened fuel-spray atomizing time period during high-speed high-load operation in which a required fuel quantity has to be increased, thus promoting atomization of fuel. This contributes to sufficient premixing of fuel with air, thus effectively suppressing the generation of soot, particulate matter (PM).

Figure 13:
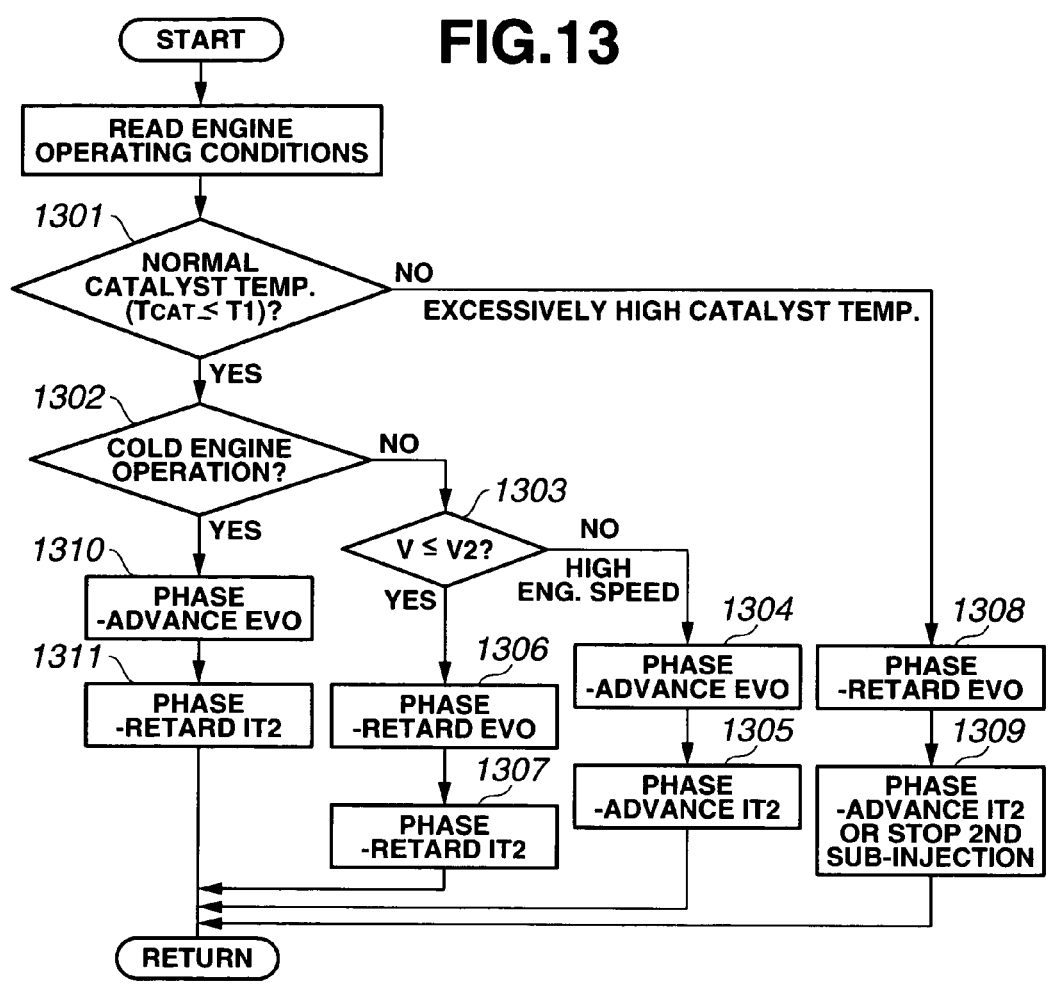
FIG. 13 is a flow chart showing the mutual relationship between the exhaust valve open timing EVO and the second sub-injection timing IT2 in the multistage fuel-injection engine of the embodiment.
Figure 14:
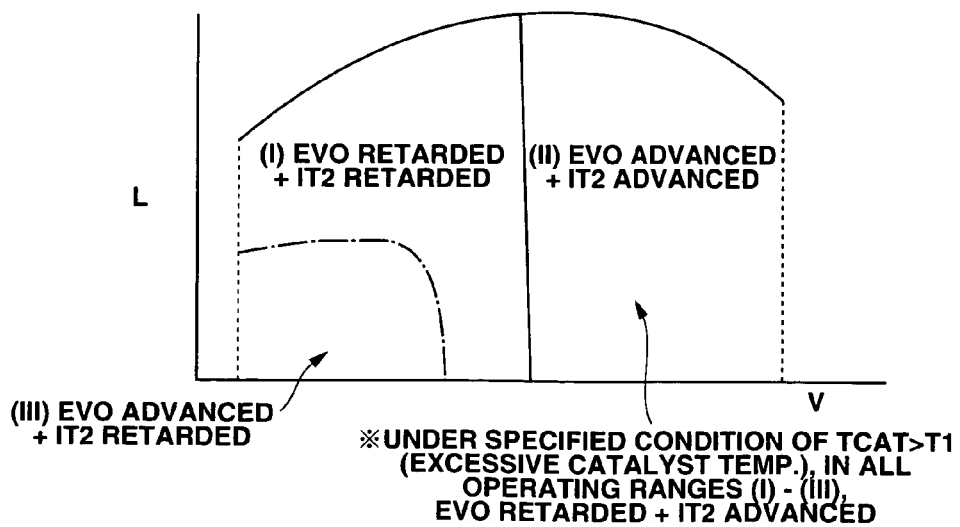
FIG. 14 is a preprogrammed characteristic map showing the relationship between the exhaust valve open timing EVO and the second sub-injection timing IT2 in the multistage fuel-injection engine of the embodiment.

FIG. 13 shows the control flow concerning the cooperative control (relevant-control) routine of 2nd sub-injection timing IT2 with respect to exhaust valve open timing EVO control, in which exhaust valve open timing EVO is controlled depending on engine operating conditions and simultaneously 2nd sub-injection timing IT2 is controlled responsively to the exhaust valve open timing EVO changed or controlled according to the exhaust valve open timing EVO control. On the other hand, FIG. 14 shows the preprogrammed characteristic map concerning a combined characteristic of a phase change (phase-advance/phase-retard) of exhaust valve open timing EVO and a phase change (phase-advance/phase-retard) of 2nd sub-injection timing IT2 with respect to both of engine speed V and indicated engine torque (i.e., engine load L). In FIG. 14, the operating range (I) is an EVO phase-retard plus IT2 phase-retard area, the operating range (II) is an EVO phase-advance plus IT2 phase-advance area, and the operating-range (III) is an EVO phase-advance plus IT2 phase-retard area. The operating range (III) corresponds to a cold-engine operation area. In FIG. 14, under a specified condition where catalyst temperature $T_{CAT}$ is excessively high and exceeds a predetermined temperature threshold value T1, in every engine operating region, that is, in all operating ranges (I) to (III), exhaust valve open timing EVO is phase-retarded, while 2nd sub-injection timing IT2 is phase-advanced.

In the IT2 cooperative control (relevant-control) routine related to or correlated with EVO control, shown in FIG. 13, first, engine operating conditions, namely, engine speed V and engine load L are read.

At step 1301, a check is made to determine whether catalyst temperature $T_{CAT}$ is normal ($T_{CAT} \leq T1$) or abnormal ($T_{CAT} > T1$) When catalyst temperature $T_{CAT}$ is normal ($T_{CAT} \leq T1$), the routine proceeds from step 1301 to step 1302. Conversely when catalyst temperature $T_{CAT}$ is abnormal ($T_{CAT} > T1$), the routine proceeds from step 1301 to step 1308.

At step 1302, a check is made to determine whether engine 1 is cold. During cold engine operation (or during cold-start operation), the routine proceeds from step 1302 to step 1310. When engine 1 is not cold, the routine proceeds from step 1302 to step 1303.

At step 1303, a check is made to determine whether the latest up-to-date informational data signal value concerning engine speed V is less than or equal to a predetermined speed value V2. When the answer to step 1303 is affirmative (V≦V2), the routine proceeds from step 1303 to step 1306. Conversely when the answer to step 1303 is negative (V>V2), the routine proceeds from step 1303 to step 1304.

At step 1304, initiated under the high-speed condition defined by V>V2, in particular, under the high-speed condition after warm-up, exhaust valve open timing EVO is phase-advanced, so as to suppress or reduce an exhaust loss, thus enhancing engine torque output at high speed operation.

At step 1305 executed subsequently to step 1304, 2nd sub-injection timing IT2 is phase-advanced responsively to the phase advance of exhaust valve open timing EVO, so as to effectively suppress for part of fuel injected during the second sub-injection period from leaking from the cylinder to the exhaust system due to exhaust valve open timing EVO phase-advanced. This contributes to the stabilized catalyst temperature even at high-speed operation after warm-up.

At step 1306, initiated under the low-speed condition defined by V≦V2, in particular, under the low-speed condition after warm-up, exhaust valve open timing EVO is phase-retarded, so as to increase the work of expansion, thus enhancing engine torque output at low speed operation after warm-up.

At step 1307 executed subsequently to step 1306, 2nd sub-injection timing IT2 is phase-retarded responsively to the phase retard of exhaust valve open timing EVO, so as to deliver a proper amount of unburned gas to the catalytic converter 301 and Diesel particulate filter 304 for rapid catalyst activation by way of burning of unburned gas in the exhaust system, thereby stabilizing the emission control performance. Assuming that 2nd sub-injection timing IT2 is not phase-retarded responsively to the phase retard of exhaust valve open timing EVO during low speed operation after warm-up, there is a possibility that a rate of burning of unburned gas, to be burnt in the exhaust system, remarkably reduces and thus a delay in catalyst warm-up (activation) occurs.

At step 1308, initiated under the condition of excessive catalyst temperature ($T_{CAT}$>T1), exhaust valve open timing EVO is phase-retarded, so as to reduce the exhaust temperature.

At step 1309 executed subsequently to step 1308, 2nd sub-injection timing IT2 is phase-advanced responsively to the phase retard of exhaust valve open timing EVO or the second sub-injection (after-injection which takes place after main injection timing IT0) is stopped responsively to the phase retard of exhaust valve open timing EVO, so as to reduce the amount of unburned fuel to be delivered to the catalytic converter 301 and DPF 304 or to stop unburned fuel delivery (unburned gas delivery) to the catalytic converter 301 and DPF 304, thus preventing the catalytic converter 301 and DPF 304 from being damaged due to rapid burning of unburned fuel.

At step 1310, initiated under cold-engine operation, exhaust valve open timing EVO is phase-advanced.

At step 1311 executed subsequently to step 1310, 2nd sub-injection timing IT2 is phase-retarded responsively to the phase advance of exhaust valve open timing EVO, so as to increase the amount of unburned gas in exhaust gases, thus promoting a temperature rise in catalytic converter 301 and a temperature rise in DPF 304 for rapid catalyst activation during cold engine operation. That is, when advancing exhaust valve open timing EVO for rapid catalyst warm-up, it is possible to effectively increase or promote leakage of fuel injected during the second sub-injection period to the exhaust system by retarding 2nd sub-injection timing IT2, thereby ensuring the accelerated catalyst warm-up by way of burning of unburned gas in the exhaust system.

In a two-stroke-cycle compression ignition engine, such as a two-stroke-cycle Diesel engine, one operating cycle of events, namely the intake and compression strokes as well as the power and exhaust strokes, is completed for every crankshaft revolution (360 degrees of crank angle). During the first 180 degrees crank angle range (in a crank angle range from 0° to 180°), the intake and compression strokes are produced. During the subsequent 180 degrees crank angle range (in a crank angle range from 180° to 360°), the power and exhaust strokes are produced. Self-ignition of the sprayed fuel occurs before TDC, corresponding to 180 degrees of crank angle. The valve-opening action of intake valve 9 and the valve-opening action of exhaust valve 10 are performed once for each crankshaft revolution. Thus, in the two-stroke-cycle engine, in FIG. 1 camshaft timing pulley 14 is driven by the crankshaft at the same revolution speed of crankshaft 2. The other structure of the two-stroke-cycle compression ignition engine is similar to that of the four-stroke-cycle compression ignition engine. In the two-stroke-cycle compression ignition engine, when intake valve closure timing IVC is brought closer to BDC, gas (air) charged in the cylinder is compressed under a condition where the mass of charged gas is great, thus increasing or rising the effective compression ratio $\epsilon'$. On the contrary, when intake valve closure timing IVC is phase-retarded with respect to BDC, for the same internal pressure in induction system 20, there is a tendency for the quantity of gas (air) charged into the cylinder to be reduced, thus lowering or decreasing the effective compression ratio $\epsilon'$.

Hereupon, it is necessary to care the fact that the quantity of air charged into the cylinder of engine 1 changes depending on intake valve closure timing IVC. When intake valve closure timing IVC is retarded, the quantity of air charged into engine 1 becomes small. Therefore, it is necessary to properly control the fuel-injection amount, fully taking into account the intake valve closure timing IVC. For this reason, the fuel-injection amount is compensated for responsively to at least sensor signals from camshaft sensor 16 and air flow sensor 17 in addition to engine speed V and engine load L (e.g., the amount APS of depression of the accelerator pedal), thereby realizing the stabilized air-fuel mixture (A/F) ratio, and consequently preventing or suppressing the generation of soot.

As discussed previously, the quantity of air charged into the cylinder changes depending on intake valve closure timing IVC. Thus, fully taking into account the air-fuel mixture (A/F) ratio, the fuel-injection amount must be varied responsively to the IVC phase change. Actually, the mass of fuel, injected from fuel injection valve 4, is controlled or changed depending on various factors, that is, the quantity Qa of air entering the engine cylinder, measured by air flow sensor 17, the accelerator-pedal depression amount APS, and engine speed V detected by crank angle sensor 5. In addition to the aforementioned sensor signals, preferably, the state of EGR valve 19 (i.e., the EGR valve opening) and the turbo-charging state (e.g., boost pressure) of turbo charger 18 may be taken into account for determining the mass of injected fuel and injection timing. As a matter of course, in the case of the occurrence of a change in intake valve open timing IVO as well as a change in intake valve closure timing IVC, it is necessary to properly change the fuel injection timing as well as the fuel-injection amount.

For the reasons discussed above, the sensor signal input from camshaft sensor 16 into the input interface of ECU 6 is important to execute the VTC phase control (that is, IVC phase control) and also to execute the electronic fuel injection control (injection amount/injection timing control) responsively to the intake valve closure timing IVC changed or controlled according to the intake valve closure timing IVC control. For instance, in the case of one-stroke injection of the Diesel engine, a fuel injection pattern is classified into a pilot-injection area, a before-injection area, a main-injection area, an after-injection area, and a post-injection area. The fuel injection pattern changes depending on engine operating conditions. In fuel injection system 505 of the block diagram shown in FIG. 7, the fuel injection pattern is given as a function f(IVC) of intake valve closure timing IVC. By the use of the predetermined or preprogrammed function representative of the relationship between the fuel injection pattern and intake valve closure timing IVC, a change in intake valve closure timing IVC can be remarkably reflected as a change in the fuel injection pattern (containing a fuel injection amount and the number of fuel injections).

Figure 15:
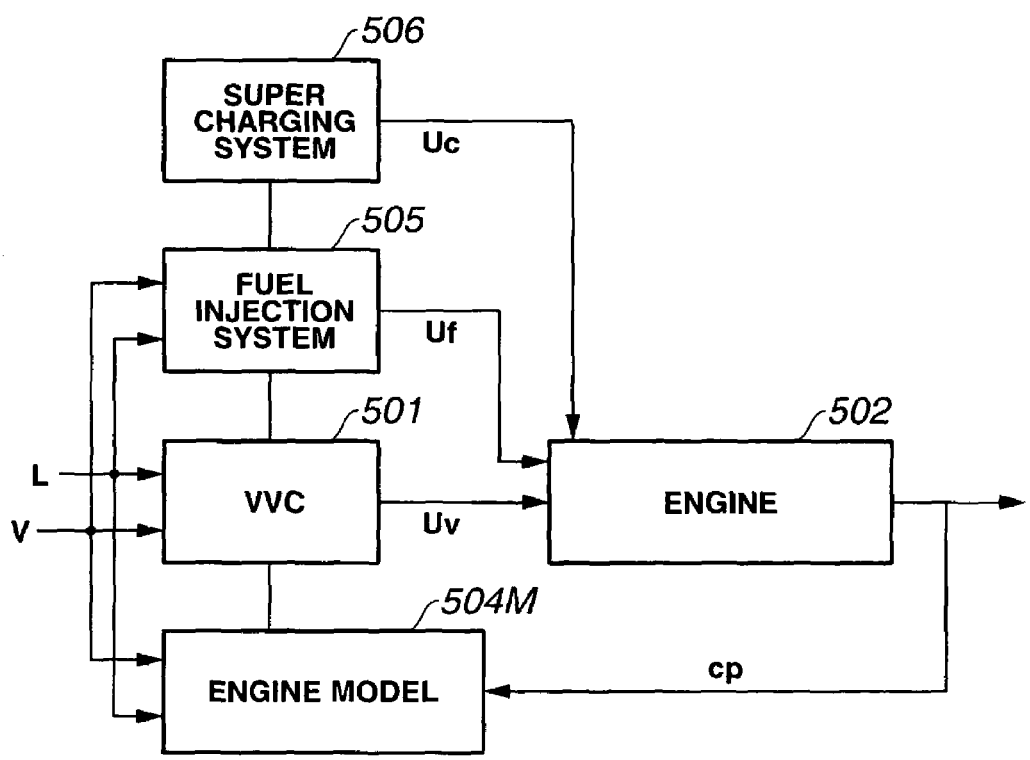
FIG. 15 is a modified block diagram of the engine control system incorporated in the multistage fuel-injection engine.

Referring now to FIG. 15, there is shown a modified block diagram for integrated engine control executed within ECU 6 of the engine control system incorporated in the multistage fuel-injection engine to improve both the engine power output and the combustion process. The modified block diagram of FIG. 15 is similar to that of FIG. 7, except that in the block diagram of FIG. 15 a control block of super-charging system 506 is further added and additionally the table block 504 of FIG. 7 is replaced with an engine-model block 504M. Thus, the same block numbers used to designate blocks in the diagram shown in FIG. 7 will be applied to the corresponding block numbers used in the modified block diagram shown in FIG. 15, for the purpose of comparison of the two different block diagrams. Blocks 506 and 504M will be hereinafter described in detail with reference to the accompanying drawings, while detailed description of blocks 501, 502, and 505 will be omitted because the above description thereon seems to be self-explanatory.

The control block of super-charging system 506 (including turbo charger 18 and the EGR system having EGR valve 19) is connected through the control block of fuel injection system 505 and the control block of VVC system 501 to the engine-model block 504M for cooperative control (relevant-control) among super-charging system 506, fuel injection system 505, and VVC system 501. As a result of the cooperative control among these systems, a manipulated variable Uc of super-charging system 506, (i) a manipulated variable of turbo charger 18, concretely, a rotational speed of turbo charger 18, a waste gate valve opening of turbo charger 18, a nozzle opening of a variable-nozzle turbine of turbo charger 18, and the like), and (ii) a manipulated variable of the EGR system, concretely, a valve opening of EGR valve 19, is determined. Therefore, the interrelation between the amount of exhaust gas recirculated (EGR) and the boost pressure can be optimally kept by adjusting the amount of residual gas by way of VVC system control, even when a change in the temperature of EGR occurs. Therefore, it is possible to reconcile both of the reduced exhaust emissions and the increased engine power output. In this manner, by way of accurate cooperative control (relevant-control) among the manipulated variable Uf of fuel injection system 505, the manipulated variable Uv of VVC system 501, and the manipulated variable Uc of super-charging system 506, it is possible to prevent undesirable leakage of part of fuel injected during the 1st sub-injection period from the cylinder via intake valve 9 to the induction system and undesirable leakage of part of fuel during the 2nd sub-injection period from the cylinder via exhaust valve 10 to the exhaust system, over wide range of conditions under which the engine operates. This effectively prevents a drop in-thermal efficiency. Engine-model block 504M estimates the state of combustion, based on the detected value of in-cylinder pressure cp detected or measured by means of the in-cylinder pressure sensor. Then, engine-model block 504M determines, based on the estimated state of combustion, whether the current values of intake valve closure timing IVC, 1st sub-injection timing (before-injection) IT1, exhaust valve open timing EVO, and 2nd sub-injection timing (after-injection) IT2 are optimal values. If at least one of manipulated variables IVC, IT1, EVO, and IT2 deviates from its optimal value, informational data stored in the associated lookup table (as shown in FIGS. 9A-9B) are suitably modified for optimizing the state of combustion.

Figure 16:
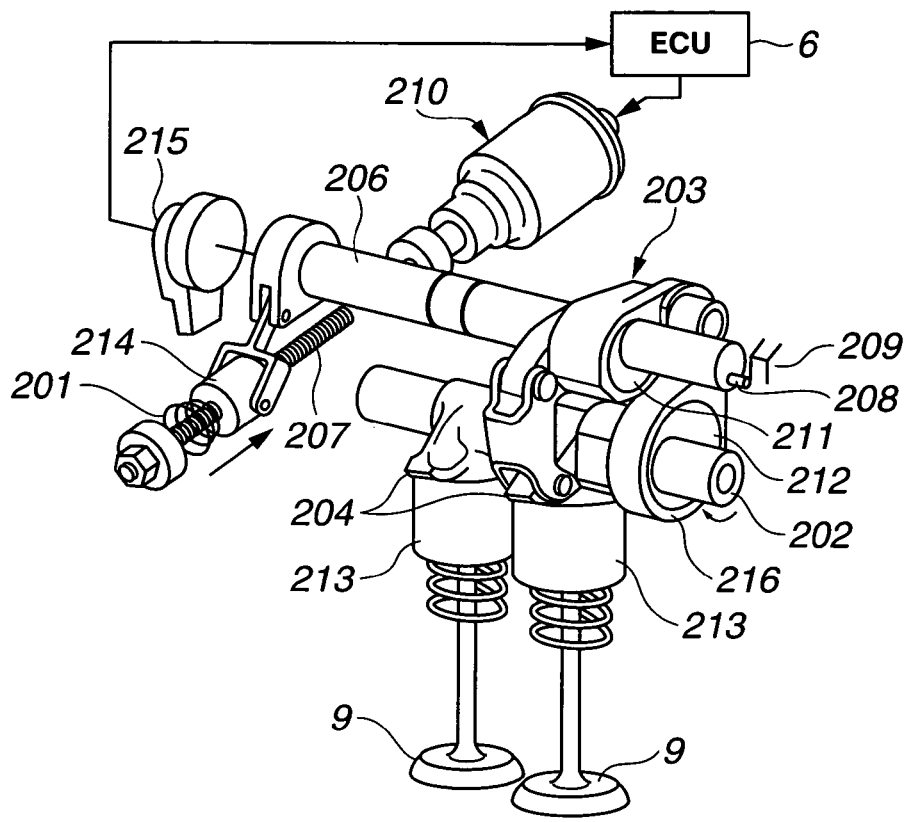
FIG. 16 is a perspective view showing the construction of another type of VVC system, which is applicable to the multistage fuel-injection engine of the embodiment and includes a continuously variable valve event and lift control (VEL) mechanism.

Referring now to FIG. 16, there is shown the continuously variable valve event and lift control (VEL) mechanism capable of continuously simultaneously varying both of the valve lift and the working angle (i.e., the valve lifted period), which is applicable to the VVC system of the multistage fuel-injection engine of the embodiment. Such VEL mechanisms have been disclosed in Japanese Patent Provisional Publication No. 2004-076618 (corresponding to Japanese Patent Application No. 2002-235400) and Japanese Patent Provisional Publication No. 2006-057535 (corresponding to Japanese Patent Application No. 2004-240262). The VEL mechanism shown in FIG. 16 is a return-spring equipped VEL mechanism with a return spring 201. As can be seen from the perspective view of FIG. 16, two intake valves 9, 9 per cylinder are installed. The actions of two intake valves 9, 9 are the same and continue as long as the engine runs. A drive shaft 202 is driven by the engine crankshaft at ½ the revolution speed of crankshaft 2 in a four-stroke-cycle engine. In the case of a two-stroke-cycle engine, drive shaft 202 is driven by the engine crankshaft at the same revolution speed of crankshaft 2. The VEL mechanism of FIG. 16 may be combined with the variable phase control means (for example, a hydraulically-operated rotary vane type VTC mechanism or a motor-driven spiral disk type VTC mechanism as shown in FIG. 5). When combining the VEL mechanism of FIG. 16 with the VTC mechanism (variable phase control means) as shown in FIG. 5, the VTC mechanism is generally interleaved or installed between drive shaft 202 and camshaft timing pulley 14. In the case of the VEL mechanism combined with the VTC mechanism, a phase of intake valve 9 (i.e., intake valve open timing IVO and intake valve closure timing IVC) and a working angle and lift characteristic of intake valve 9 can be simultaneously automatically controlled or adjusted. The VEL and VTC mechanisms either alone or in combination may be utilized as the variable valve actuation mechanism. Rotary motion of drive shaft 202 is converted through an eccentric cam 212, a link arm 216 and a rocker arm 203 into oscillating motion of an output cam, often called a "rockable cam" 204. Oscillating motion of output cam 204 is further converted through a tappet (or a valve lifter) 213 into a valve stroke (opening/closing action) of intake valve 9. Rocker arm 203 is linked to an eccentric cam 211 slidably fitted to the cylindrical inner peripheral portion of rocker arm 203, such that the fulcrum of rocker arm 203 is changeable by rotating a control shaft 206, and thus a change in the cam lift of output cam 204 occurs. The return-spring equipped VEL mechanism of FIG. 16 uses a rotary-to-linear motion converter, such as a ball-bearing screw mechanism, for changing the angular phase of control shaft 206. The rotary-to-linear motion converter (the ball-bearing screw mechanism) is comprised of at least a warm shaft 207 (i.e., a ball bearing shaft with helical grooves), a recirculating ball nut 214, recirculating balls (not shown) provided in the helical grooves, and an attitude-switching actuator 210 having a driving connection with the ball bearing shaft 207. Rotating ball bearing shaft 207 by attitude-switching actuator 210 creates axial motion of nut 214. Axial motion of nut 214 is converted through a linkage (not numbered) into rotary motion of control shaft 206. A position sensor (or a control-shaft phase-angle sensor) 215 is provided for detecting the actual angular position of control shaft 206. The sensor signal from position sensor 215 is input into the input interface of ECU 6 for closed-loop control for attitude-switching actuator 210, such that the actual working angle and lift characteristic of intake valve 9 can be brought closer to the desired characteristic. In the return-spring equipped VEL mechanism of FIG. 16, under a condition where attitude-switching actuator 210 is de-energized and thus there is no torque application from the actuator to ball bearing shaft 207, nut 214 is axially moved in the direction indicated by the arrow by way of the spring force of return spring 201. By way of axial movement of nut 214 in the direction indicated by the arrow, control shaft 206 rotates counterclockwise, until a stop pin 208, which is fixedly connected to the tip of control shaft 206, is brought into abutted-engagement with a stopper 209, fixedly connected to the engine cylinder head. In this manner, with actuator 210 de-energized, control shaft 206 can be always kept at its spring-loaded position (i.e., an initial angular position) by means of return spring 201.

Figure 17:
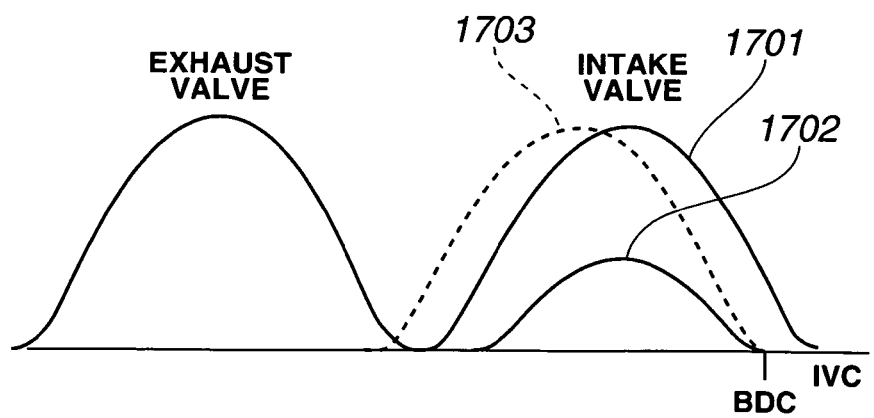
FIG. 17 is a valve event and lift control characteristic diagram showing valve event and lift characteristics attained by the VEL mechanism shown in FIG. 16.

Referring now to FIG. 17, there is shown the working angle and lift characteristic, in other words, the valve event and lift (VEL) characteristic obtained when the VEL mechanism of FIG. 16 is applied as the valve operating mechanism of the intake valve side. The VEL characteristic denoted by reference sign 1703 (see the characteristic curve indicated by the phantom line in FIG. 17), corresponds to an intake-valve working angle and lift characteristic (simply, a valve lift characteristic) given during an engine starting period. Under a condition where stop pin 208 is in abutted-engagement with stopper 209 with attitude-switching actuator 210 de-energized and thus control shaft 206 is kept at the spring-loaded position, the VEL characteristic of intake valve 9 is set to a comparatively small valve lift characteristic denoted by reference sign 1702. Under this condition, the valve lift characteristic of intake valve 9 is properly compensated for and contracted by the return-spring equipped VEL mechanism so that intake valve closure timing IVC is phase-advanced with respect to the piston BDC position, and thus the engine is in a startability guarantee control state. That is, by virtue of the use of the VEL mechanism of FIG. 16, it is possible to certainly realize a phase advance of intake valve closure timing IVC, required in the operating range (IV) shown in FIG. 12, namely, during an engine idling period or during an engine starting period. Conversely when the valve lift characteristic of intake valve 9 is properly adjusted and expanded to the maximum lift characteristic by the return-spring equipped VEL mechanism, the working angle of intake valve 9 is also increased and as a result intake valve closure timing IVC is set to a timing value phase-retarded from the BDC position (see the characteristic curve 1701 indicated by the solid line in FIG. 17). As appreciated from the right-hand side intake-valve lift characteristics of FIG. 17, the valve lift characteristic (working angle and valve lift) can be expanded (increased) or contracted (decreased) by controlling the operation of attitude-switching actuator 210 of the VEL mechanism, depending on operating conditions of engine 1. When actuator 210 is de-activated to permit free rotation of ball bearing shaft 207, control shaft 206 is rotated to the spring-loaded angular position by the spring force of return spring 201 and kept at the spring-loaded position at which intake valve closure timing IVC is set to a timing value substantially corresponding to the piston BDC position (i.e., IVC≈BDC). As discussed above, even when only the VEL mechanism of the VEL and VTC mechanisms is used in the VVC system, intake valve closure timing IVC can be easily phase-advanced with respect to BDC by only the VEL mechanism to create a rise in effective compression ratio $\epsilon'$. The rise in effective compression ratio $\epsilon'$ contributes to the good startability and enhanced engine idling performance. Even by the use of only the VEL mechanism, it is possible to continuously vary the valve lift characteristic from the maximum characteristic curve 1701 to the minimum characteristic curve 1702 in a manner so as to continuously phase-change intake valve closure timing IVC. There is one-to-one correspondence between the intake valve closure timing IVC and the working angle and lift characteristic. Thus, it is possible to accurately detect or estimate the actual intake valve closure timing IVC by means of the control-shaft phase-angle sensor (i.e., position sensor 215).

Hereinafter explained are several advantages obtained by the combined system of the VEL and VTC mechanisms. Suppose that only the VTC mechanism of the VEL and VTC mechanisms is used in the VVC system, and intake valve closure timing IVC is phase-advanced or phase-retarded. By the use of only the VTC mechanism, intake valve open timing IVO is also phase-advanced or phase-retarded in parallel with an IVC phase-advance/phase-retard. Suppose that only the VEL mechanism of the VEL and VTC mechanisms is used in the VVC system, and intake valve closure timing IVC is phase-changed. By the use of only the VEL mechanism, the working angle is also changed simultaneously with the IVC phase change. That is to say, when intake valve closure timing IVC is changed by the use of either one of the VEL and VTC mechanisms, there is a possibility that intake valve open timing IVO cannot be adjusted or controlled to a target value. For the reasons discussed above, the use of the VEL and VTC mechanisms in combination is effective to optimal high-precision control for both of intake valve timings IVC and IVO. For instance, suppose that the condition defined by IVC≈BDC has to be realized or achieved by only the VEL mechanism. In such a case, the valve lift characteristic is set to the small valve-lift characteristic curve 1702. That is to say, at the same time when the condition of IVC≈BDC is satisfied, a decrease in the valve lift takes place. In contrast, in the case of the VVC system employing the VEL and VTC mechanism combined with each other, it is possible to phase-advance intake valve open timing IVO, while satisfying the condition defined by IVC≈BDC (see the characteristic curve 1703 indicated by the phantom line in FIG. 17). By a combination of working angle and lift characteristic control performed by the VEL mechanism and phase control performed by the VTC mechanism, it is possible to realize or achieve an arbitrary intake valve open timing IVO for the same intake valve closure timing IVC. Furthermore, in the case of the VVC system employing the VEL and VTC mechanism combined with each other, it is possible to remarkably change intake valve closure timing IVC, while holding intake valve open timing IVO at a timing value substantially corresponding to the piston TDC position. In compression ignition engines, the geometrical compression ratio $\epsilon$ is set to a comparatively high compression ratio, and thus there is an increased tendency for undesirable interference between an engine valve and a piston to occur. Assuming that intake valve open timing IVO is fixed to a timing value substantially corresponding to TDC, it is possible to avoid the problem of undesirable interference between the engine valve and the piston. In the shown embodiments, it is possible to easily detect or estimate intake valve closure timing IVC in real time by the VTC-phase information from camshaft sensor 16, serving as the phase-angle sensor for the intake camshaft, or the VEL working angle information from position sensor 215, serving as the phase-angle sensor for control shaft 206.

In the shown embodiments, as the variable valve actuation mechanism incorporated in the VVC system, the VTC mechanism (see FIG. 5) and the VEL mechanism (see FIG. 16) are exemplified. In lieu thereof, a variable valve lift (VVL) mechanism capable of varying a valve lift and a valve timing may be used. Alternatively, the variable valve actuation mechanism may be constructed by a variable working angle mechanism as disclosed in Japanese Patent Provisional Publication No. 8-260923 (corresponding to U.S. Pat. No. 5,636,603), in which a valve lift is constant and a working angle is changeable.

As fuel for compression ignition engines such as Diesel engines, dimethyl ether as well as light gas oil can be used. As fuel for premix compression ignition engines, gasoline can be used.

It will be appreciated that, even in the case of application of the previously-described inventive concept to spark-ignited internal combustion engines or gasoline engines that fuel is premixed with air and the premixed air-fuel mixture is compressed and the premixed and compressed air-fuel mixture is secondarily ignited by means of a spark plug, the previously-noted same effects {e.g., good matching between intake valve closure timing IVC and 1st sub-injection timing IT1 (avoidance of undesirable fuel leakage to the induction system) and/or good matching between exhaust valve open timing EVO and 2nd sub-injection timing IT2 (avoidance of undesirable fuel leakage to the exhaust system)} can be obtained. That is to say, according to the inventive concept, it is possible to provide the previously-noted same effects (good matching between the timings IVC and IT1 and/or good matching between the timings EVO and IT2) in any multistage fuel-injection internal combustion engines in which fuel is self-ignited by compressing the incoming air, or fuel is ignited by a spark plug, or fuel is ignited by way of a combination of self-ignition and spark-ignition.

As will be appreciated from the above, according to the multi-stage fuel-injection internal combustion engine of the embodiment employing the multi-stage fuel injection system and the variable valve actuation control system, it is possible to effectively suppress or prevent (i) undesirable leakage of part of fuel injected during the 1st sub-injection period to the induction system due to mismatching between intake valve closure timing IVC and 1st sub-injection timing IT1 (that is, a loss in effect of 1st sub-injection timing IT1) and/or (ii) undesirable leakage of part of fuel injected during the 2nd sub-injection period to the exhaust system due to mismatching between exhaust valve open timing EVO and 2nd sub-injection timing IT2 (that is, a loss in effect of 2nd sub-injection timing IT2), thus avoiding a deterioration in engine power output or a deterioration in exhaust-emission control performance over wide operating range. In other words, in the multi-stage fuel-injection-internal combustion engine, it is possible to enhance various engine performances, such as engine power output, emission control performance, fuel economy, catalyst warm-up performance, thermal efficiency, combustion stability and the like by optimized phase-matching between intake valve closure timing IVC and 1st sub-injection timing IT1 and/or by optimized phase-matching between exhaust valve open timing EVO and 2nd sub-injection timing IT2.

The entire contents of Japanese Patent Application No. 2005-286668 (filed Sep. 30, 2005) are incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A multi-stage fuel-injection internal combustion engine comprising:
   a fuel injection system capable of injecting fuel at a plurality of injection timings in one operating cycle of the engine, the plurality of injection timings comprising at least one sub-injection timing in addition to a main injection timing;
   a variable valve actuation control system capable of changing intake valve closure timing or exhaust valve open timing by changing a valve lift characteristic or valve-open and valve-closure timings of at least one of an intake valve and an exhaust valve; and
   a control unit configured to define at least two domains of a specified engine operating region as a first operating range and a second operating range and to set one of the injection timings to have a predetermined first relation with either one of the intake valve closure timing and the exhaust valve open timing in the first operating range and to set one of the injection timings to have a predetermined second relation with either one of the intake valve closure timing and the exhaust valve open timing in the second operating range.

2. A multi-stage fuel-injection internal combustion engine comprising:
   a fuel injection system capable of injecting fuel at a plurality of injection timings in one operating cycle of the engine;
   a variable valve actuation control system capable of changing intake valve closure timing or exhaust valve open timing by changing a valve lift characteristic or valve-open and valve-closure timings of at least one of an intake valve and an exhaust valve;
   a sensor provided to detect the valve lift characteristic or the valve-open and valve-closure timings of at least one of the intake and exhaust valves; and
   a control unit being responsive to a sensor signal from the sensor, for executing cooperative control of one of the injection timings responsively to either one of the intake valve closure timing and the exhaust valve open timing.

3. A multi-stage fuel-injection internal combustion engine comprising:
   a fuel injection system enabling at least one sub-injection in addition to main injection;
   a variable valve actuation control system capable of changing intake valve closure timing or exhaust valve open timing;
   a first sensor provided to detect operating conditions of the engine;
   a second sensor provided to detect a valve lift characteristic or valve-open and valve-closure timings of at least one of an intake valve and an exhaust valve; and
   a control unit configured to initiate cooperative control of sub-injection timing responsively to either one of the intake valve closure timing and the exhaust valve open timing, when a difference between the intake valve closure timing detected by the second sensor and a desired intake valve closure timing value determined based on the engine operating conditions detected by the first sensor becomes greater than or equal to a predetermined threshold value or when a difference between the exhaust valve open timing detected by the second sensor and a desired exhaust valve open timing value determined based on the engine operating conditions detected by the first sensor becomes greater than or equal to the predetermined threshold value.

4. A multi-stage fuel injection internal combustion engine comprising:
  a fuel injection system enabling at least one sub-injection in addition to main injection;
  a variable valve actuation control system capable of changing intake valve closure timing or exhaust valve open timing; and
  a control unit being responsive to operating conditions of the engine, for executing cooperative control of sub-injection timing responsively to either one of the intake valve closure timing and the exhaust valve open timing,
  wherein timing of the sub-injection, injected before the main injection, is phase-retarded responsively to a phase advance of the intake valve closure timing of the variable valve actuation control system, in a very light load and low speed range substantially corresponding to idling.

5. A multi-stage fuel-injection internal combustion engine comprising:
  a fuel injection system enabling at least one sub-injection in addition to main injection;
  a variable valve actuation control system capable of changing intake valve closure timing or exhaust valve open timing; and
  a control unit being responsive to operating conditions of the engine, for executing cooperative control of sub-injection timing responsively to either one of the intake valve closure timing and the exhaust valve open timing,
  wherein timing of the sub-injection, injected before the main injection, is phase-retarded responsively to a phase retard of the intake valve closure timing of the variable valve actuation control system, in a light load range.

6. A multi-stage fuel-injection internal combustion engine comprising:
  a fuel injection system enabling at least one sub-injection in addition to main injection;
  a variable valve actuation control system capable of changing intake valve closure timing or exhaust valve open timing; and
  a control unit being responsive to operating conditions of the engine, for executing cooperative control of sub-injection timing responsively to either one of the intake valve closure timing and the exhaust valve open timing,
  wherein timing of the sub-injection, injected before the main injection, is phase-advanced responsively to a phase advance of the intake valve closure timing of the variable valve actuation control system, in a high load and low speed range.

7. A multi-stage fuel-injection internal combustion engine comprising:
  a fuel injection system enabling at least one sub-injection in addition to main injection;
  a variable valve actuation control system capable of changing intake valve closure timing or exhaust valve open timing; and
  a control unit being responsive to operating conditions of the engine, for executing cooperative control of sub-injection timing responsively to either one of the intake valve closure timing and the exhaust valve open timing,
  wherein timing of the sub-injection, injected before the main injection, is phase-advanced responsively to a phase retard of the intake valve closure timing of the variable valve actuation control system, in a high load and high speed range.

8. A multi-stage fuel-injection internal combustion engine comprising:
  a fuel injection system enabling at least one sub-injection in addition to main injection;
  a variable valve actuation control system capable of changing intake valve closure timing or exhaust valve open timing; and
  a control unit being responsive to operating conditions of the engine, for executing cooperative control of sub-injection timing responsively to either one of the intake valve closure timing and the exhaust valve open timing,
  wherein timing of the sub-injection, injected after the main injection, is phase-advanced responsively to a phase advance of the exhaust valve open timing of the variable valve actuation control system, in a high speed range.

9. A multi-stage fuel-injection internal combustion engine comprising:
  a fuel injection system enabling at least one sub-injection in addition to main injection;
  a variable valve actuation control system capable of changing intake valve closure timing or exhaust valve open timing; and
  a control unit being responsive to operating conditions of the engine, for executing cooperative control of sub-injection timing responsively to either one of the intake valve closure timing and the exhaust valve open timing,
  wherein timing of the sub-injection, injected after the main injection, is phase-retarded responsively to a phase retard of the exhaust valve open timing of the variable valve actuation control system, in a low speed range.

10. A multi-stage fuel-injection internal combustion engine comprising:
  a fuel injection system enabling at least one sub-injection in addition to main injection;
  a variable valve actuation control system capable of changing intake valve closure timing or exhaust valve open timing; and
  a control unit being responsive to operating conditions of the engine, for executing cooperative control of sub-injection timing responsively to either one of the intake valve closure timing and the exhaust valve open timing,
  wherein timing of the sub-injection, injected after the main injection, is phase-advanced responsively to a phase retard of the exhaust valve open timing of the variable valve actuation control system, under a condition where a catalyst temperature is excessively high.

11. A multi-stage fuel-injection internal combustion engine comprising:
  a fuel injection system enabling at least one sub-injection in addition to main injection;
  a variable valve actuation control system capable of changing intake valve closure timing or exhaust valve open timing; and
  a control unit being responsive to operating conditions of the engine, for executing cooperative control of sub-injection timing responsively to either one of the intake valve closure timing and the exhaust valve open timing, wherein timing of the sub-injection, injected after the main injection, is phase-retarded responsively to a phase advance of the exhaust valve open timing of the variable valve actuation control system, during cold engine operation.

12. A multi-stage fuel-injection internal combustion engine comprising:
a fuel injection system enabling at least a first sub-injection injected before main injection and a second sub-injection injected after the main injection;
a first variable valve actuation mechanism capable of changing at least intake valve closure timing;
a second variable valve actuation mechanism capable of changing at least exhaust valve open timing; and
a control unit being responsive to operating conditions of the engine, for executing cooperative control of timing of the first sub-injection, injected before the main injection, responsively to the intake valve closure timing, and for executing cooperative control of timing of the second sub-injection, injected after the main injection, responsively to the exhaust valve open timing.

13. The multi-stage fuel-injection internal combustion engine as claimed in claim 12, wherein:
the timing of the first sub-injection, injected before the main injection, is phase-retarded responsively to a phase advance of intake valve closure timing of the first variable valve actuation mechanism, in a very light load and low speed range substantially corresponding to idling.

14. The multi-stage fuel-injection internal combustion engine as claimed in claim 12, wherein:
the timing of the first sub-injection, injected before the main injection, is phase-retarded responsively to a phase retard of intake valve closure timing of the first variable valve actuation mechanism, in a light load range.

15. The multi-stage fuel-injection internal combustion engine as claimed in claim 12, wherein:
the timing of the first sub-injection, injected before the main injection, is phase-advanced responsively to a phase advance of intake valve closure timing of the first variable valve actuation mechanism, in a high load and low speed range.

16. The multi-stage fuel-injection internal combustion engine as claimed in claim 12, wherein:
the timing of the first sub-injection, injected before the main injection, is phase-advanced responsively to a phase retard of intake valve closure timing of the first variable valve actuation mechanism, in a high load and high speed range.

17. The multi-stage fuel-injection internal combustion engine as claimed in claim 12, wherein:
the timing of the second sub-injection, injected after the main injection, is phase-advanced responsively to a phase advance of exhaust valve open timing of the second variable valve actuation mechanism, in a high speed range.

18. The multi-stage fuel-injection internal combustion engine as claimed in claim 12, wherein:
the timing of the second sub-injection, injected after the main injection, is phase-retarded responsively to a phase retard of exhaust valve open timing of the second variable valve actuation mechanism, in a low speed range.

19. The multi-stage fuel-injection internal combustion engine as claimed in claim 12, wherein:
the timing of the second sub-injection, injected after the main injection, is phase-advanced responsively to a phase retard of exhaust valve open timing of the second variable valve actuation mechanism, under a condition where a catalyst temperature is excessively high.

20. The multi-stage fuel-injection internal combustion engine as claimed in claim 12, wherein:
the timing of the second sub-injection, injected after the main injection, is phase-retarded responsively to a phase advance of exhaust valve open timing of the second variable valve actuation mechanism, during cold engine operation.

* * * * *